United States Patent
Hara et al.

(10) Patent No.: US 6,945,045 B2
(45) Date of Patent: Sep. 20, 2005

(54) DRIVING APPARATUS

(75) Inventors: Yoshihiro Hara, Kishiwada (JP); Junichi Tanii, Izumi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/260,523

(22) Filed: Oct. 1, 2002

(65) Prior Publication Data

US 2003/0079472 A1 May 1, 2003

(30) Foreign Application Priority Data

Oct. 1, 2001  (JP) ........................................ 2001-304875
Dec. 27, 2001  (JP) ........................................ 2001-395892

(51) Int. Cl.⁷ ............................................. F01N 29/10
(52) U.S. Cl. ........................................ 60/527; 60/528
(58) Field of Search ..................... 60/527, 528, 529

(56) References Cited

U.S. PATENT DOCUMENTS

| 4,337,090 A | * | 6/1982 | Harrison ..................... 148/402 |
| 4,860,040 A | | 8/1989 | Tamamura et al. |
| 4,932,210 A | | 6/1990 | Julien et al. |
| 6,169,269 B1 | * | 1/2001 | Maynard ..................... 219/209 |
| 6,574,958 B1 | * | 6/2003 | MacGregor ................. 60/527 |

FOREIGN PATENT DOCUMENTS

| JP | 61-122381 | * | 6/1986 |
| JP | 3-977 | | 1/1991 |
| JP | 5-118273 | | 5/1993 |
| JP | 9-126116 | | 5/1997 |
| JP | 2000-110709 | * | 4/2000 |
| JP | 2001-173550 | * | 6/2001 |
| JP | 2001-273035 | * | 10/2001 |
| JP | 2002-515566 | * | 5/2002 |
| JP | 2002-180951 | | 6/2002 |
| JP | 2002-294371 | | 10/2002 |
| JP | 2002-296633 | | 10/2002 |
| JP | 2003-000977 | * | 1/2003 |
| JP | 2003-507625 | * | 2/2003 |
| JP | 2003-507825 | | 2/2003 |

OTHER PUBLICATIONS

Kuribayashi, "Systems and Control", vol. 29, No. 5, 1985.

* cited by examiner

Primary Examiner—Hoang Nguyen
(74) Attorney, Agent, or Firm—McDermott Will & Emery LLP

(57) ABSTRACT

Two shape memory alloy members d7 and d8 are connected to a movable member. Continuously, one and then the other of the shape memory alloy members d7 is heated alternately by application of a voltage or current thereto so that, by the generated force exerted by one shape memory alloy member d7 deformed by being heated, the other shape memory alloy member d8 is deformed and the movable member is moved. The shape memory alloy members d7 and d8 are made of a Ti—Ni—Cu alloy subjected to heat treatment at 300° C. or higher, and has an operating temperature of 70° C. or higher.

17 Claims, 22 Drawing Sheets

DRIVING APPARATUS

This application is based on Japanese Patent Applications Nos. 2001-304875 and 2001-395892 filed on Oct. 1, 2001 and Dec. 27, 2001, respectively, the contents of which are hereby incorporated by reference.

BACKGROUND OF THE INVENTION

1. Field of the Invention

The present invention relates to a driving apparatus employing a shape memory alloy, and more particularly to a driving apparatus that is capable of correcting for camera shake by exploiting expansion/contraction of a shape memory alloy.

2. Description of the Prior Art

A shape memory alloy (hereinafter referred to also as an "SMA"), even if it is plastically deformed by application of a force at a temperature below the temperature at which the martensitic transformation ends, recovers its original shape when heated to above the temperature at which the reverse transformation ends. By exploiting this shape memory effect, it is possible to build an actuator employing a shape memory alloy. In fact, diverse studies have been made in this field. For example, an article by Kuribayashi in "Systems and Control," Vol. 29, No. 5, 1985, presents the results of a study on mathematical models and position/force control of control elements employing shape memory alloys.

FIG. 21 is a diagram illustrating the principle of a driving apparatus employing a shape memory alloy. In this figure is shown a driving apparatus 50 of a twin-SMA type. The twin-SMA-type driving apparatus 50 has shape memory alloy members 52 and 53 connected at both ends of a movable member 51. The shape memory alloy here is typically operated by the Joule heat that is generated when electric current is passed through it.

Specifically, when electric current is passed between both ends of a shape memory alloy, heat is generated, and thus the shape memory alloy recovers its original length. As a result, the shape memory alloy contracts, and its elastic modulus against tension increases. When the electric current flowing through the shape memory alloy is cut off, the heat dissipates, and thus the temperature of the shape memory alloy falls. As a result, the shape memory alloy becomes soft and easily deformable elastically.

Here, the force (hereinafter referred to as the "generated force") Fd applied to the movable member 51 is given by formula (1) below, where Fp represents the generated force ascribable to the contraction of one of the shape memory alloy members, and Fm represents the reaction of the other.

$$Fd = Fp - Fm \quad (1)$$

Hence, when electric current is passed between both ends 52a and 52b of the shape memory alloy member 52 (hereinafter referred to also as the "pSMA") and no electric current is passed between both ends 53a and 53b of the shape memory alloy member 53 (hereinafter referred to also as the "mSMA"), the generated force Fd changes from a balanced state to a state deviated to the positive side.

In this state, the generated force Fp ascribable to the pSMA 52 on one side, which has contracted by being heated, makes the mSMA 53 on the other side expand. This makes the movable member 51 move in the positive (+) direction. When the movable member 51 travels a predetermined distance, the generated force Fd becomes equal to 0 (Fp=Fm). Thus, the driving apparatus 50 comes to rest. By applying additional electric current to pSMA 52, the movable member 51 can be driven farther in the positive (+) direction.

Likewise, when electric current is passed between both ends 53a and 53b of the mSMA 53 and no electric current is passed between both ends 52a and 52b of the pSMA 52, while the mSMA 53 contracts, the pSMA 52 expands. Thus, the movable member 51 moves in the negative (−) direction.

FIG. 22 shows the temperature hysteresis observed in the movement of the movable member 51 when the driving apparatus 50 is operated. In this figure, along the vertical axis is taken the position of the movable member 51, and along the horizontal axis are taken the temperatures of the shape memory alloy members (pSMA and mSMA) 52 and 53. When electric current is passed through the pSMA 52 and no electric current is passed through the mSMA 53, the movable member 51 moves as indicated by an arrow A1. Meanwhile, when the temperatures of the pSMA 52 and the mSMA 53 are t2 and t1, respectively, the movable member 51 is located in the middle position.

When electric current is passed through the mSMA 53 and no electric current is passed through the pSMA 52, the movable member 51 moves as indicated by an arrow A2. Meanwhile, when the temperatures of the pSMA 52 and the mSMA 53 are t1 and t2, respectively, the movable member 51 is located in the middle position.

By energizing and de-energizing the shape memory alloy members 52 and 53 at short time intervals, the movable member 51 can be moved around the middle position as indicated by broken lines B1. Thus, by incorporating the driving apparatus 50 in a camera and making it move an optical system in response to and in the opposite direction to camera shake resulting from unstable holding of the camera, it is possible to correct for the camera shake.

Camera shake that occurs during photographing using a camera typically has a frequency of from a few Hz to 10 Hz. Therefore, when the driving apparatus 50 is used for camera shake correction, it needs to have sufficiently fast response to follow a shake of at least 10 Hz. FIG. 23 is a diagram showing the response characteristics of the driving apparatus 50 observed when the shape memory alloy members 52 and 53 are energized and de-energized at a frequency of 10 Hz. In this figure, along the vertical axis is taken the position of the movable member 51, and along the horizontal axis is taken the lapse of time (in msec). The broken line indicates the ideal movement (target position) without a delay in response, and the solid lines indicate the actual movement at different ambient temperatures around the driving apparatus 50, namely 25° C., 50° C., and 60° C.

Here, the shape memory alloy members 52 and 53 are made of a Ti—Ni alloy, of which the operating temperature T is 65° C. The operating temperature T denotes the average temperature at which the shape memory alloy is operated, and is given by T=(t1+t2)/2 (see FIG. 22).

FIGS. 24 and 25 show the temperature hysteresis observed in the movement of the movable member 51 at ambient temperatures of 25° C. and 60° C., respectively. In these figures, along the vertical axis is taken the position of the movable member 51, and along the horizontal axis is taken the temperatures of the shape memory alloy members (pSMA and mSMA) 52 and 53. These figures show that, at an ambient temperature of 25° C. around the driving apparatus 50, the width tw of the temperature hysteresis is small and the distance traveled is long. This makes it possible to make the movable member 51 move in such a way that it considerably precisely follows the input electric current.

However, at an ambient temperature of 50° C. or 60° C. around the driving apparatus 50, it is not possible to obtain the desired amplitude, and a long delay in phase results from temperature hysteresis. This makes it impossible to follow the input electric current, causing a maximum error Dmax of 50% relative to the target position.

Specifically, for example, when the pSMA 52 is energized, heat dissipation from mSMA 53 is insufficient, and thus the elastic force of the mSMA 53 surpasses the contractive force of the pSMA 52. Subsequently, as heat is dissipated from the mSMA 53, the pSMA 52 contracts with a delay, and the movable member 51 moves in the positive (+) direction. However, before the movable member 51 reaches the target position, the mSMA 53 is energized, making it impossible to produce the desired amount of correction. This leads to the problem of insufficient camera shake correction at 50° C., which is generally considered the upper limit of the temperature range in which a camera or the like is guaranteed to operate correctly.

Moreover, there is a possibility that, even when one shape memory alloy member is de-energized, its temperature continues to rise, and a possibility that, even when the other shape memory alloy member ends being heated, its temperature does not sufficiently fall. As a result, the shape memory alloy members 52 and 53 are overheated to an excessively high temperature. If the shape memory alloy is heated to above 100° C. and kept at that temperature for a few tens of seconds, it no longer retains its original shape. This leads to the problem of the driving apparatus 50 becoming inoperative, or the driving apparatus 50 being even destroyed.

SUMMARY OF THE INVENTION

An object of the present invention is to provide a driving apparatus employing a shape memory alloy which offers fast response under a high-ambient-temperature condition. Another object of the present invention is to provide a driving apparatus employing a shape memory alloy which is free from overheating.

To achieve the above objects, according to one aspect of the present invention, a driving apparatus, is provided with: a shape memory alloy member connected to a movable member; and an electric supplier for heating the shape memory alloy member by applying a voltage or current thereto so as to make the shape memory alloy member expand and contract, through the generation of heat based on the application by the supplier and through the dissipation of heat therefrom resulting from the suspension of the application by the supplier, and thereby drive the movable member to move. Here, the shape memory alloy member is operated at a temperature of 70° C. or higher.

According to another aspect of the prevent invention, a driving apparatus is provided with: a shape memory alloy member connected to a movable member; an electric supplier for heating the shape memory alloy member by applying a voltage or current thereto; and a cooler for cooling the shape memory alloy member. Here, the movable member is driven to move by making the shape memory alloy member expand and contract through the generation of heat based on the application by the supplier and through the dissipation of heat therefrom by the suspension of the application by the supplier and by the cooling by the cooler.

According to still another aspect of the prevent invention, a driving apparatus is provided with: a shape memory alloy member connected to a movable member; a driving controller for heating the shape memory alloy member by applying a voltage or current thereto so that the movable member is driven to move by the generated force exerted by the shape memory alloy member deformed by being heated; and an overheating preventer for preventing the overheating of the shape memory alloy member.

According to a further aspect of the prevent invention, a driving apparatus is provided with: a shape memory alloy member connected to a movable member; a driving controller for heating the shape memory alloy member by applying a voltage or current thereto so that the movable member is driven to move by the generated force exerted by the shape memory alloy member deformed by being heated; and an overheating predictor for detecting a sign of upcoming overheating of the shape memory alloy member. Here, the driving controller restrains or suspends the energization of the shape memory alloy member according to the result of detection by the overheating predictor.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Drive Mechanism and Construction of Actuators

Figure 1:
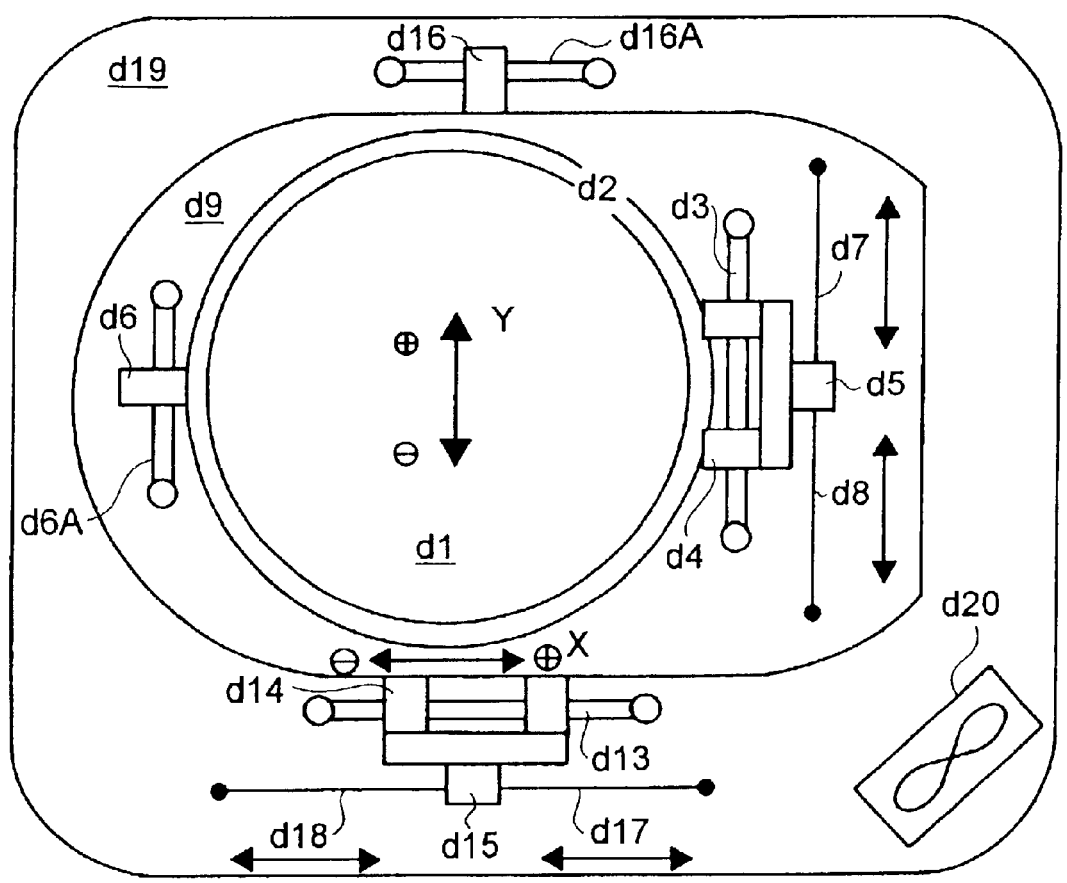
FIG. 1 is a diagram showing an outline of the construction of a camera shake correction system incorporating the driving apparatus of a first embodiment of the invention.

Hereinafter, embodiments of the present invention will be described with reference to the drawings. FIG. 1 is a front view showing an outline of a camera shake correction system incorporating the driving apparatus of a first embodiment of the invention. The camera shake correction system corrects the optical system of the camera for camera shake by moving a correction optical system dl in two directions perpendicular to each other. To achieve this, the camera shake correction system incorporates two driving apparatuses (actuators) each having a pair of SMAs (in the present specification, this structure will be called a twin-SMA type), i.e., each having shape memory alloy members connected at both ends of a part of a movable member including the correction optical system d1.

The correction optical system dl is held in a correction optical system frame d2. The correction optical system frame d2 has slide guides d4 and d6 formed integrally therewith. Through the slide guides d4 and d6 are placed slide shafts d3 and d6A, respectively, which are fixed to a base plate d9. In this way, the correction optical system dl is supported so as to be movable in the Y direction relative to the base plate d9.

The base plate d9 has slide guides d14 and d16 formed integrally therewith. Through the slide guides d14 and d16 are placed slide shafts d13 and d16A, respectively, which are fixed to a base structure d19. In this way, the base plate d9 is supported so as to be movable in the X direction relative to the base structure d19.

The slide guides d4 and d14 have actuator pins d5 and d15, respectively, formed so as to project therefrom. The actuator pin d5 functions as a terminal (drive point) by way of which shape memory alloy members d7 and d8 are connected. At both ends of the actuator pin d5 are fitted one end of the shape memory alloy member (pSMA) d7 and one end of the shape memory alloy member (mSMA) d8, respectively. The shape memory alloy members d7 and d8 are, at their respective other ends, fixed to the base plate d9.

The pSMA d7 and mSMA d8, when heated by application of a voltage or current thereto, contract by restoring their original lengths. When the voltage or current being applied to the pSMA d7 and mSMA d8 is cut off, as heat dissipates, their temperatures fall, and their elastic moduli lower.

Accordingly, when the pSMA d7 is energized and simultaneously the mSMA d8 is de-energized, the actuator pin d5 moves in the Y+ (plus, that is, positive) direction. On the other hand, when the mSMA d8 is energized and simultaneously the pSMA d7 is de-energized, the actuator pin d5 moves in the Y− (minus, that is, negative) direction. In this way, a Y drive actuator a26 (see FIG. 2) is built that moves the movable member, composed of the correction optical system d1, the correction optical system frame d2, the slide guides d4 and d6, and the actuator pin d5, as a whole in the Y direction.

Likewise, at both ends of the actuator pin d15 are fitted one end of a shape memory alloy member (pSMA) d17 and one end of a shape memory alloy member (mSMA) d18, respectively. The shape memory alloy members d17 and d18 are, at their respective other ends, fixed to the base structure d19. Accordingly, when the pSMA d17 is energized and simultaneously the mSMA d18 is de-energized, the actuator pin d15 moves in the X+ direction. On the other hand, when the mSMA d18 is energized and simultaneously the pSMA d17 is de-energized, the actuator pin d15 moves in the X− direction.

In this way, an X drive actuator a24 (see FIG. 2) is built that moves the movable member, composed of the base plate d9 having the correction optical system d1 and other components mounted thereon, the slide guides d14 and d16, and the actuator pin d15, as a whole in the X direction. The slide guides d6 and d16 not only guide the movable member, but also prevent the movable member from inclining in the direction perpendicular to the plane of the figure.

The pSMAs d7 and d17 and the mSMAs d8 and d18 are made of a Ti—Ni—Cu alloy. Of the total mass of the pSMAs d7 and d17 and the mSMAs d8 and d18, about 50% is Ti, 3% or more is Cu, and 47% or less is Ni. Moreover, the Ti—Ni—Cu alloy has been subjected, twice or more times and for three minutes or longer each time, to heat treatment at a temperature of 300° C. to 700° C. under strain of $9.8 \times 10^6$ Pa or higher.

A Ti—Ni alloy, which is a common type of shape memory alloy, exhibits two-stage transformation. However, by adding more and more Cu to it, it is possible to suppress the low-temperature-side transformation and heighten the transformation temperature. Thus, a Ti—Ni—Cu alloy has higher transformation start and reverse transformation start temperatures than other shape memory alloys such as Ti—Ni alloys. This makes a Ti—Ni—Cu alloy preferable here.

Figure 11:
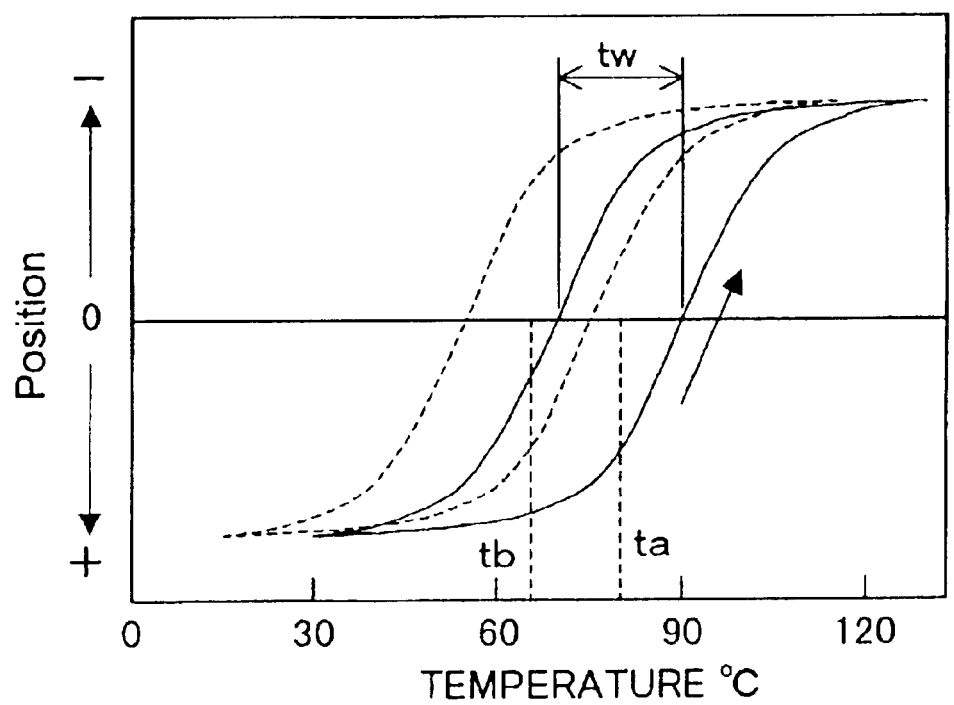
FIG. 11 is a graph of the temperature hysteresis of the shape memory alloy of the driving apparatus of the first embodiment.

FIG. 11 is a diagram showing the temperature hysteresis of the pSMAs d7 and d17 and the mSMAs d8 and d18. In this figure, along the vertical axis is taken the displacement, and along the horizontal axis is taken the temperature (in ° C.). It is to be noted that this figure shows the characteristics of a single SMA under a load applied to it in the direction in which it expands. The characteristics of the SMA used in this embodiment are indicated by solid lines, and, for comparison, those of a conventional SMA are indicated by broken lines. In the figure, the upward direction is that of contraction.

The figure shows that, whereas the operating temperature tb of the conventional SMA is 65° C., the operating temperature ta of the SMA of this embodiment is 70° C. or higher, and its temperature hysteresis has a width of 20° C. or smaller.

Figure 12:
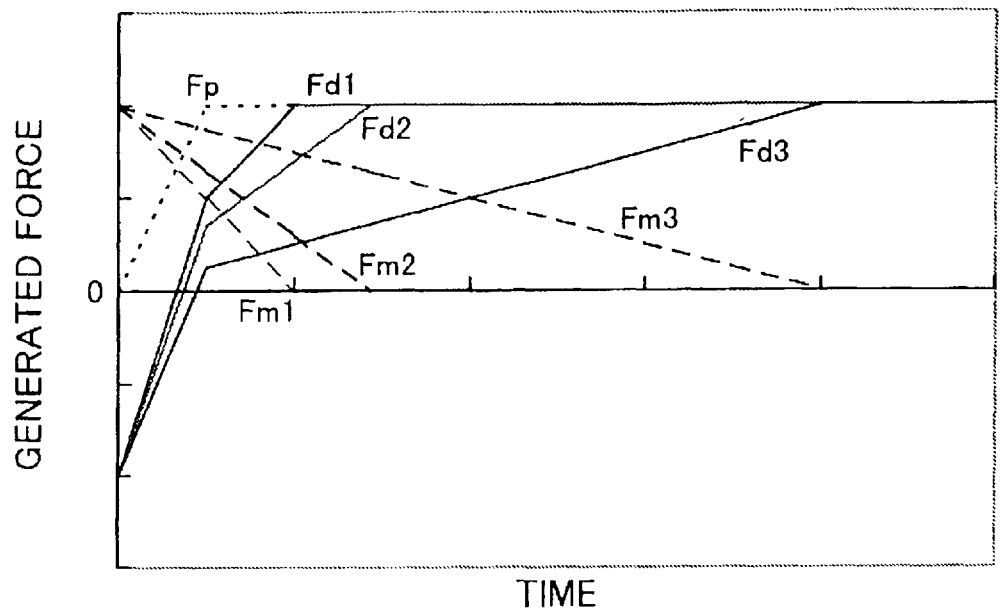
FIG. 12 is a graph of the heat dissipation response characteristics of the driving apparatus of the first embodiment.

FIG. 12 shows the response characteristics of the generated force Fd exerted by the X and Y drive actuators a24 and a26 (see FIG. 2) composed of the pSMAs d7 and d17 and the mSMAs d8 and d18. In this figure, along the vertical axis is taken the generated force, and along the horizontal axis is taken the lapse of time. Here, the pSMAs d7 and d17 are energized and the mSMAs d8 and d18 are de-energized. The characteristics at ambient temperatures of 25° C. and 50° C. are indicated by lines Fd1 and Fd2, respectively. For comparison, the characteristics of an actuator composed of conventional SMAs at an ambient temperature of 50° C. are indicated by a line Fd3.

The generated force Fd1, Fd2, or Fd3 is given by formula (1) noted earlier. Lines Fm1, Fm2, and Fm3 indicate the variation in the generated force (reaction) resulting from heat dissipation from the mSMAs d8 and d18 which correspond to Fd1, Fd2, and Fd3, respectively. The generated force Fp exerted by the pSMAs d7 and d17 increases sharply because they contract by being heated by energization, and exhibits similar characteristics under any of the conditions mentioned above.

The figure shows that, although the generated force Fd2 exerted by the actuator at an ambient temperature of 50° C. exhibits somewhat delayed response relative to that (Fd1) observed at 25° C., it still exhibits markedly shortened response time relative to that (Fd3) observed conventionally because heat dissipation from the heat-dissipation-side mSMA requires less time here. The amount of heat transferred Q [kcal/hr] during heat dissipation is given by Q=−kΔt, where k [kcal/hr ° C.] represents the heat transfer coefficient and the Δt [° C.] represents the temperature difference from the ambient temperature.

Figure 13:
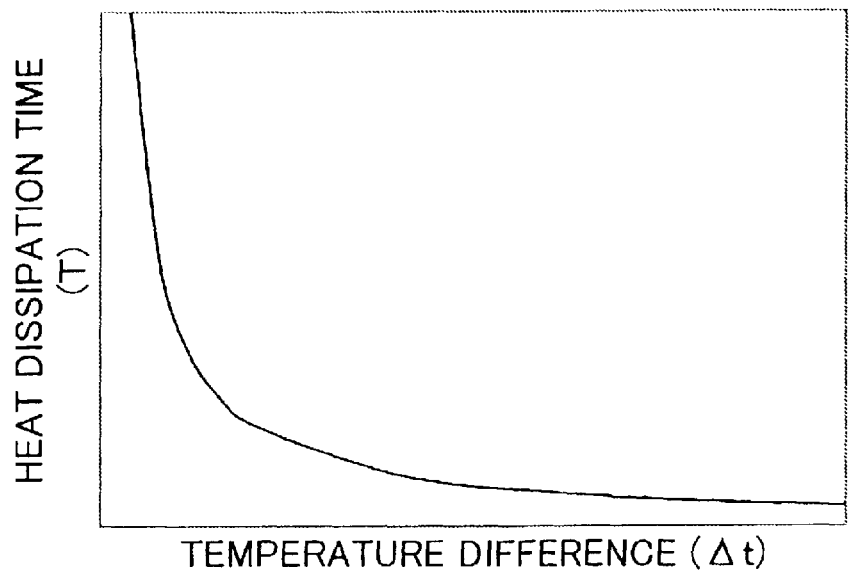
FIG. 13 is a graph showing the relationship between the heat dissipation time of the shape memory alloy of the driving apparatus of the first embodiment and the ambient temperature.

Hence, as shown in FIG. 13, the heat dissipation time T (along the vertical axis) and the temperature difference Δt (along the horizontal axis) exhibit a relationship such that, the larger the temperature difference Δt from the ambient temperature, the shorter the heat dissipation time T. Accordingly, in this embodiment, where the SMA has an operating temperature ta (see FIG. 11) of 83° C., the temperature difference is greater than is conventionally typical at an ambient temperature of 50° C., resulting in shorter heat dissipation time. This makes it possible to realize a camera shake correction system that offers fast response under a high-ambient-temperature condition.

Camera Shake Correction System

Figure 2:
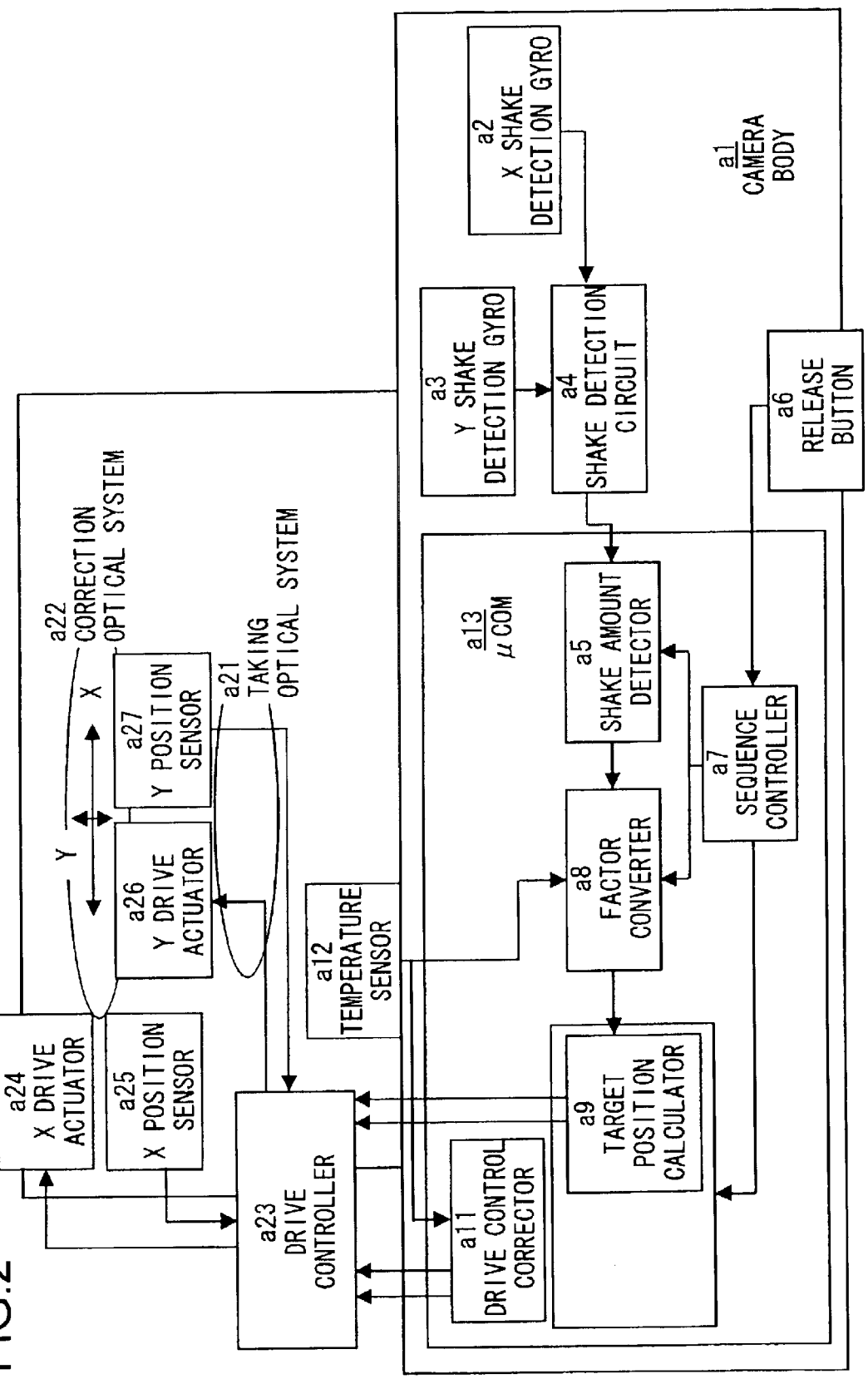
FIG. 2 is a block diagram of the camera shake correction system incorporating the driving apparatus of the first embodiment.

FIG. 2 shows the configuration of the camera shake correction system. The camera shake correction system adopts, as a camera shake detection system, one using gyrosensors (angular velocity sensors) and, as a correction optical system for camera shake correction, one relying on lens shifting. Moreover, it adopts, as a drive control system for driving the movable members, one relying on analog servo control that employs the twin-SMA-type drive apparatuses described above and PSDs (position sensitive devices).

When camera shake occurs, the film surface or image sensor shakes, resulting in an blurred picture taken. This kind of blurring can be corrected for by detecting the amount of camera shake and deflecting the light from the subject with a correction optical system in such a direction as to cancel the camera shake. Camera shake ascribable to vibrations of human muscles typically have a frequency of about 10 Hz, and is therefore considered to cause a camera to vibrate sinusoidally at a frequency of about 10 Hz.

In FIG. 2, reference symbol a1 represents a camera body, a2 and a3 represent gyrosensors, a4 represents a shake detection circuit, a5 represents a shake amount detector, a6 represents a release button, a7 represents a sequence controller, a8 represents a factor converter, a9 represents a target position calculator, a11 represents a drive control corrector, a12 represents a temperature sensor, a13 represents a microcomputer ($\mu$COM), a21 represents a taking optical system, a22 represents a correction optical system (corresponding to d1 in FIG. 1), a23 represents a drive controller, a24 represents an X drive actuator like the one described earlier, a25 represents an X position sensor, a26 represents a Y drive actuator, and a27 represents a Y position sensor.

Camera shake is detected by the two gyrosensors a2 and a3. The gyrosensors a2 and a3 each output a signal representing the angular velocity of the shake caused when the camera is made to rotate by the camera shake. The gyrosensors a2 and a3 each detect the rotational angular velocity in one direction; specifically, the gyrosensor a2 detects the rotational shake in the X direction (horizontal direction), and the gyrosensor a3 detects the rotational shake in the Y direction (vertical direction).

The shake detection circuit a4 is composed of a filter circuit for reducing the noise in the signals from the gyrosensors a2 and a3, an integrating circuit for converting the angular velocity signals into signals representing angles, and other circuits. The sequence controller a7 controls the shake amount detector a5, the factor converter a8, and the target position calculator a9 in order to control sequences related to photographing, camera shake correction, and other operations performed by the camera.

The shake amount detector a5 reads, at regular time intervals, the X- and Y-direction angle signals output from the shake detection circuit a4, determines the amounts of shake detx and dety of the camera in the X and Y directions, and outputs them. The factor converter a8 converts the amounts of shake detx and dety determined by the shake amount detector a5 when the camera is brought into an exposure preparation state into amounts of movement px and py required to cancel the shake, giving consideration to individual and temperature-related variations in the optical performance of the correction optical system a22. Temperature-related correction is effected according to the temperature detected by the temperature sensor a12.

The target position calculator a9 converts the amounts of movement px and py into actual drive signals drvx and drvy, giving consideration to variations in the performance of the driving section resulting from environmental and secular changes ascribable to the temperature of the drive controller a23 and the X and Y drive actuators a24 and a26 (in particular, the shape memory alloy members incorporated therein).

The drive control corrector a11 optimizes the way driving is effected. That is, it sets the optimum gain so that, even when there are variations in the driving performance resulting from individual variations in the performance of the X and Y drive actuators a24 and a26 and the driving mechanism and variations in temperature, driving is effected in the best possible way with given components and at a given temperature.

The drive control corrector a11, by receiving a signal from the temperature sensor a12, also corrects the servo gains, namely P, D, and DD, for the X and Y drive actuators a24 and a26, which use SMAs and whose performance varies as temperature rises. It is to be noted that, in the circuit blocks shown inside the frame of the microcomputer a13, signals are processed digitally by the microcomputer a13.

The taking optical system a21, working together with the correction optical system a22, images the light from the subject on the surface of film or of an image sensor inside the camera. The correction optical system a22, when driven by the X and Y drive actuators a24 and a26, deflects the light from the subject in the direction so driven. This makes it possible to correct image blurring caused by camera shake. The drive controller a23 is an analog servo circuit that continuously exercises control such that the correction optical system a22 is driven to move to the target position in X and Y direction as output from the target position calculator a9.

The X and Y drive actuators a24 and a26, which are of a twin-SMA type as described earlier, drive the correction optical system a22 to move in the X and Y directions, respectively. The X and Y position sensors a25 and a27 detect the movement and position, in the X and Y directions, of the correction optical system a22, which is the movable member. In this embodiment, the X and Y position sensors a25 and a27 each adopt a circuit including, as will be described later, an LED (light-emitting diode) c21 mounted together with a slit on the movable side and a PSD (position sensitive device) c22 mounted on the stationary side.

When the user of the camera operates the release button a6 with the intention of taking a picture, the sequence controller a7 detects it. When the release button a6 is pressed halfway, an exposure preparation switch is brought into an ON state, causing the sequence controller a7 to start preparations for exposure. In the stage of preparations for exposure, measurements are made of light conditions, the distance to the subject, and the like. When the release button a6 is pressed fully, the camera is brought into an exposure state. Then, a lens for focus adjustment provided in the taking optical system a21 starts being driven, that is, the correction optical system a22 starts being driven for camera shake correction.

Configuration of Drive Controller

Figure 3:
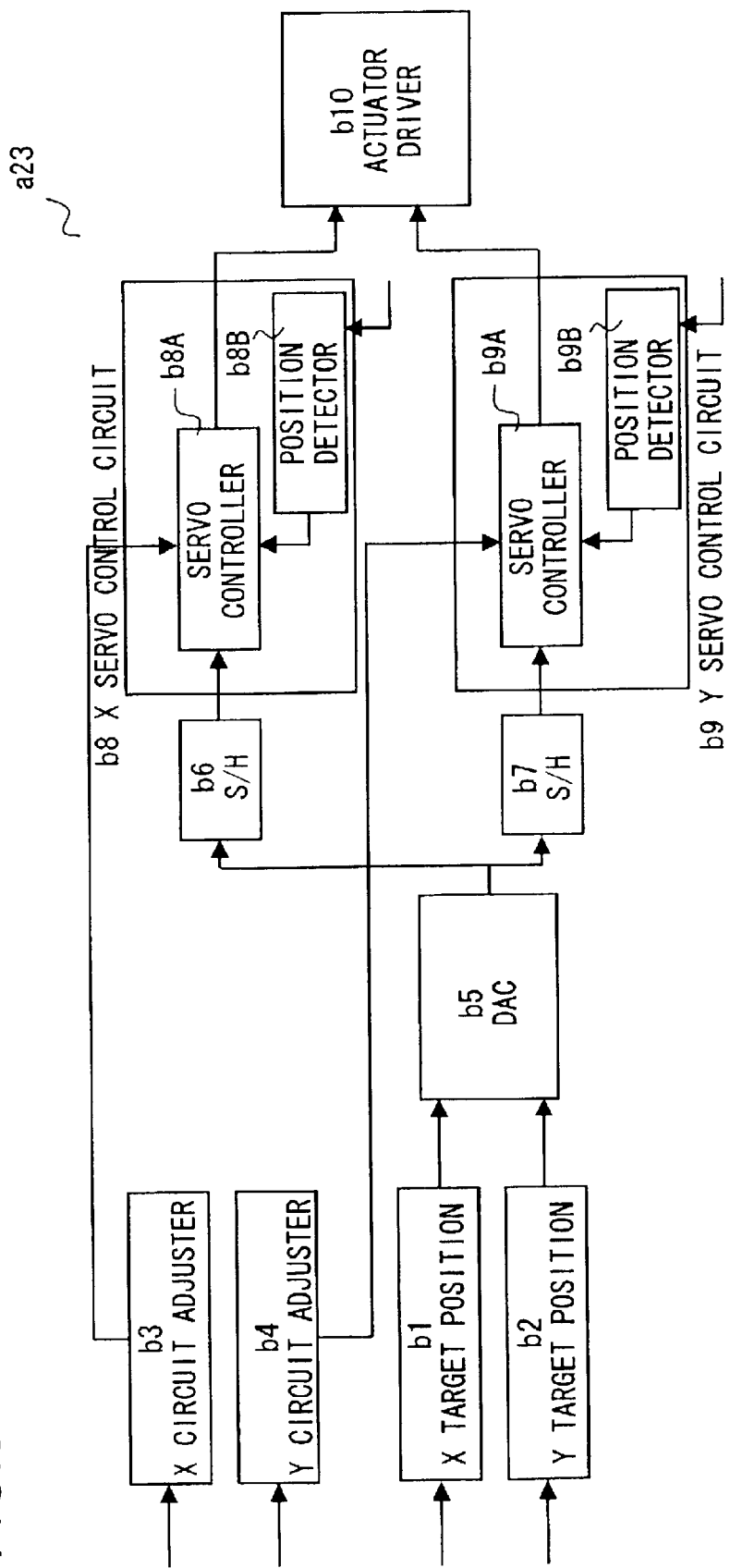
FIG. 3 is a block diagram of the driving controller of the camera shake correction system incorporating the driving apparatus of the first embodiment.

FIG. 3 is a diagram showing the configuration of the drive controller a23. In FIG. 3, reference symbol b1 represents an X target position data receiver, b2 represents a Y target position data receiver, b3 represents an X circuit adjustment gain data receiver, b4 represents a Y circuit adjustment gain data receiver, b5 represents a D/A (digital-to-analog) converter (DAC), b6 and b7 represent sample-and-hold (S/H) circuits, b8 represents an X servo control circuit, b9 represents a Y servo control circuit, and b10 represents an actuator driver. The servo control circuits b8 and b9 include servo controllers b8A and b9A and position detectors b8B and b9B, respectively.

The circuit blocks constituting the drive controller a23 are grouped roughly into a data receiver section b1 to b4, a D/A converter section b5, a servo control circuit section b6 to b9, and an actuator driver section b10. The X and Y target position data receivers b1 and b2 store the X- and Y-direction drive signal data drvx and drvy output from the target position calculator a9 (see FIG. 2). The X and Y circuit adjusters b3 and b4 store, for the gain setting of the servo control circuits b8 and b9, X- and Y-direction gain setting data output from the drive control corrector a11 (see FIG. 2).

Next, how the target position is set will be described with reference to FIG. 3. First, an X/Y direction selecting circuit (not shown) selects the X direction, so that the X-direction target position data drvx is transferred to and stored in the X target position data receiver b1. When the storage is complete, the D/A converter b5 performs D/A conversion on the value stored in the X target position data receiver b1.

At this point, one S/H circuit b6 is in a sampling state, and therefore the output of the D/A converter b5 is fed, as an X-direction target position voltage, to the X servo control circuit b8. At the same point, the other S/H circuit b7 is in a holding state, and therefore the output from the D/A converter b5 is not fed to the Y servo control circuit b9.

Subsequently, the X/Y direction selecting circuit selects the Y direction, so that the Y-direction target position data drvy is transferred to and stored in the Y target position data receiver b2, and the D/A converter b5 performs D/A conversion on that value. At this point, one S/H circuit b6 is in a holding state, and thus continues holding the previously D/A-converted X-direction value; the other S/H circuit b7 is in a sampling state, and thus the most recently D/A-converted value is fed to the Y servo control circuit b9. In this way, the X- and Y-direction values are output alternately and repeatedly to achieve data output to the X and Y servo control circuits b8 and b9.

The X and Y servo control circuits b8 and b9 have basically the same configuration, and therefore, here, the X servo control circuit b8 will be described as their representative. The position detector b8B and the servo controller b8A provided inside the X servo control circuit b8 permit circuit gains, namely XP, XD, and XDD gains, to be varied to values set by the X circuit adjuster b3. The P gain denotes a proportional gain (the gain for the difference between the target position and the current position). The D gain denotes a differentiation gain (the gain for compensating for a 90° phase delay). The DD gain denotes a double-differentiation gain (the gain for compensating for another 90° phase delay).

The position detector b8B provided inside the X servo control circuit b8 receives the output of the X position sensor a25 (see FIG. 1). Likewise, the position detector b9B provided inside the Y servo control circuit b9 receives the output of the Y position sensor a27 (see FIG. 1). The actuator driver b10 is so configured as to produce outputs linearly, so that it applies to the X and Y drive actuators a24 and a26 (see FIG. 1) voltages proportional to the voltages fed to it.

Figure 4:
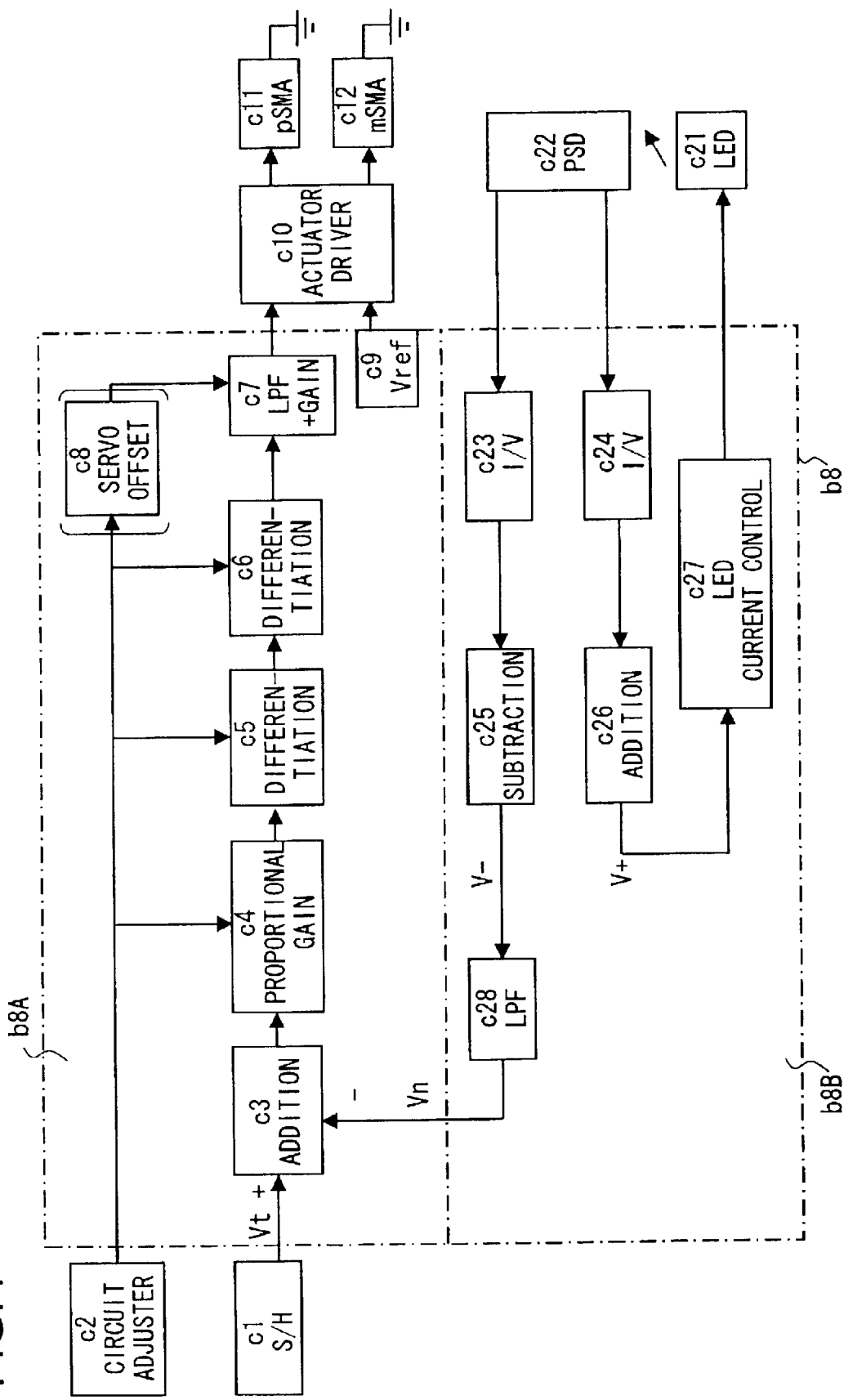
FIG. 4 is a block diagram of the servo control circuit of the camera shake correction system incorporating the driving apparatus of the first embodiment.

FIG. 4 is a diagram showing the circuit configuration of the servo control circuit b8. The servo control circuit b9 has basically the same configuration. In FIG. 4, reference symbol cl represents a S/H circuit (corresponding to b6 and b7 in FIG. 3), c2 represents a circuit adjuster (corresponding to b3 and b4 in FIG. 3), c3 is an addition circuit, c4 represents a proportional gain circuit, c5 and c6 represent differentiation circuits, c7 represents a voltage gain conversion/LPF (low-pass filter) circuit, c8 represents a servo offset circuit, c9 represents a Vref (reference voltage) portion, c10 represents an actuator driver (corresponding to b10 in FIG. 3), c11 represents a pSMA (corresponding to d7 and d17 in FIG. 1), c12 represents an mSMA (corresponding to d8 and d18), c21 represents an LED, c22 represents a PSD, c23 and c24 represent I/V (current-to-voltage) conversion circuit, c25 represents a subtraction circuit, c26 represents an addition circuit, c27 represents an LED current controller, and c28 represents an LPF (low-pass filter).

The S/H circuit cl is in a sampling state when the value of its own direction is being D/A-converted, and is in a holding state when the value of the other direction is being D/A-converted. In this way, the S/H circuit cl outputs the voltage Vt corresponding to the target position to the servo control circuit. The voltage Vn corresponding to the actual position is produced through the position detection section c23 to c28.

The circuit gain adjuster c2 modifies the digital data so that the P gain is adjusted in the proportional gain circuit c4, the D gain is adjusted in the differentiation circuit c5, and the DD gain is adjusted in the differentiation circuit c6. When required, the servo offset circuit c8 varies the analog value of the offset voltage of the servo control circuit.

Figure 5:
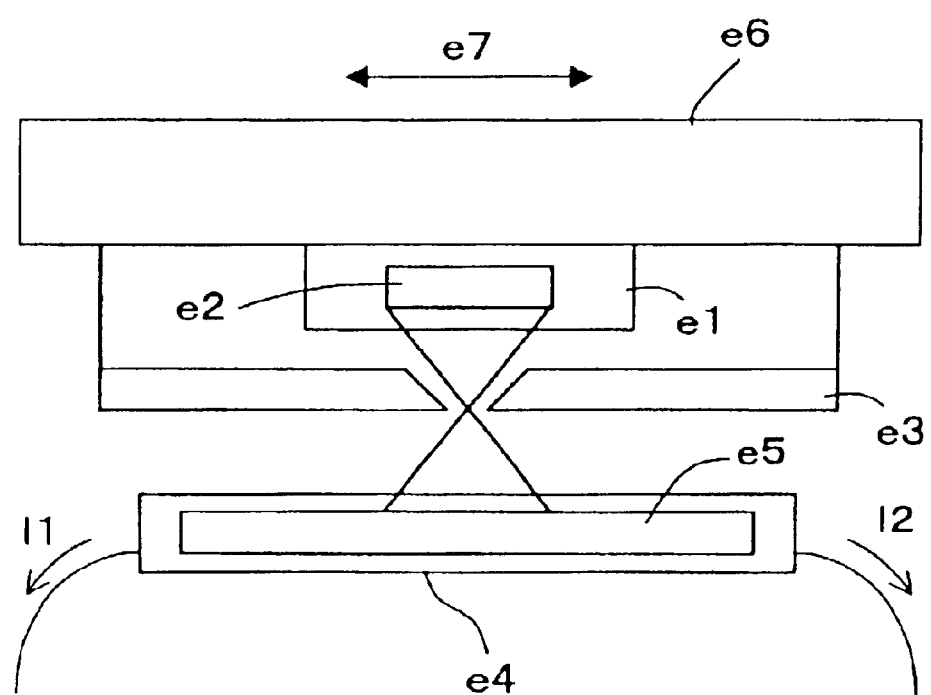
FIG. 5 is a diagram showing an outline of the construction of the position sensor of the camera shake correction system incorporating the driving apparatus of the first embodiment.

FIG. 5 shows the construction of the X and Y position sensors a25 and a27 (see FIG. 1) used to detect the position in the X and Y directions. In the figure, reference symbol e1 represents a surface-mounted LED, corresponding to c21 in FIG. 4, and e2 represents a light-emitting chip provided inside the LED e1. Reference numeral e3 represents a slit for concentrating the light beam emitted from the LED e1 to obtain sharp directivity. The slit e3 is so formed as to be wider on the light-emitting side and narrower on the light-receiving side. This helps obtain sharp directivity while minimizing the loss of energy. Reference symbol e4 represents a surface-mounted PSD, and e5 represents a light-receiving chip provided inside the PSD e4.

The light-emitting side of the X and Y position sensors a25 and a27 is fitted directly to a correction optical block e6 that constitutes a part of the correction optical system d1 and a22 (see FIGS. 1 and 2) and the correction optical system frame d2 (see FIG. 1). As the correction optical block e6 moves, the light-emitting side moves together in the direction indicated by an arrow e7.

By contrast, the PSD e4, on the light-receiving side, remains stationary. Thus, as the correction optical block e6 moves, the barycenter of the light beam on the PSD e4 moves. As the light-receiving position on the light-receiving element e5 moves, the ratio of the photoelectric conversion currents I1 and I2 from the PSD e4 varies. Thus, by monitoring the ratio of the photoelectric conversion currents I1 and I2, it is possible to determine the position of the correction optical block e6.

The light beam exiting through the slit e3 is so shaped as to be narrow in the movement detection direction e7 and wide in the direction perpendicular thereto. Giving the emitted light beam such directivity makes it possible to detect a position only in the direction in which the sensor is expected to detect the position.

Specifically, even when the correction optical block e6 moves in another direction (a direction perpendicular to the arrow e7, for example perpendicular to the plane of the figure), the state of the slit-shaped light beam on the light-receiving surface of the PSD e4 does not change. Thus, the position signal is not affected. Movement in the direction perpendicular to the arrow e7 and perpendicular to the plane of the figure is detected by the position sensor having the same configuration as that described above and arranged in the direction perpendicular thereto.

Next, the circuit configuration of the position detection section c23 to c28 will be described with reference to FIG. 4. The IN conversion circuits c23 and c24 convert the currents 11 and 12 output from both ends of the PSD c22 (corresponding to e4 in FIG. 5) into voltages. The addition circuit c26 adds together the voltage values output from the I/V conversion circuit c24. The subtraction circuit c25 subtracts the voltage values output from the I/V conversion circuit c23 from each other.

The LED current controller c27 is a current controller for the LED c21, and, working together with the addition circuit c26, controls the voltage V+ to be constant. By keeping the voltage V+ constant all the time, it is possible to detect the movement position of the correction optical block e6 by monitoring the output V− of the subtraction circuit c25. The LPF c28 reduces the noise (high-frequency components) in the position signal, and outputs the voltage Vn corresponding to the actual lens position.

Next, the circuit configuration of the servo controller b8A will be described with reference to FIG. 4. The servo controller b8A exercises PDD control. The addition circuit c3 calculates the difference between the target position voltage Vt and the actual position voltage Vn. The actual position voltage has a negative sign, and thus the difference therefrom can be calculated by the use of an addition circuit. The proportional gain circuit c4 converts the gain for the voltages, and sets the proportional gain. The differentiation circuit c5 compensates for a 90° phase delay, and differentiation circuit c6 compensates for another 90° phase delay.

The proportional gain circuit c4 and the differentiation circuits c5 and c6 are adjusted by the circuit adjuster c2. This makes it possible to absorb individual variations, if any, in the performance of the driving mechanism. Moreover, the circuit adjuster c2 corrects for the influence of variations in temperature, and therefore it is possible to obtain the optimum gains corrected according to the detected temperature.

The voltage gain conversion/LPF circuit c7 performs ultimate gain conversion and high-frequency noise reduction The offset circuit c8 of the servo control circuit is used whenever necessary to achieve optimization, giving consideration to individual variations and the influence of temperature, by adjusting the offset voltage of the servo circuit.

The Vref portion c9 feeds a reference voltage (Vref) to the actuator driver c10. The actuator driver c10, which produces outputs linearly, applies to the actuators the same voltages as those fed to it.

For example, when a motor is connected with its positive (+) terminal connected to the pSMA c11 and its negative (−) terminal connected to the mSMA c12, it is possible to effect movement in the opposite direction. One end of the pSMA c11 is connected to the output side of the actuator driver c10, and the other end thereof is grounded (connected to power ground). Likewise, one end of the mSMA c12 is connected to the output side of the actuator driver c10, and the other end thereof is grounded (connected to the power ground).

Configuration of Actuator Driver

Figure 6:
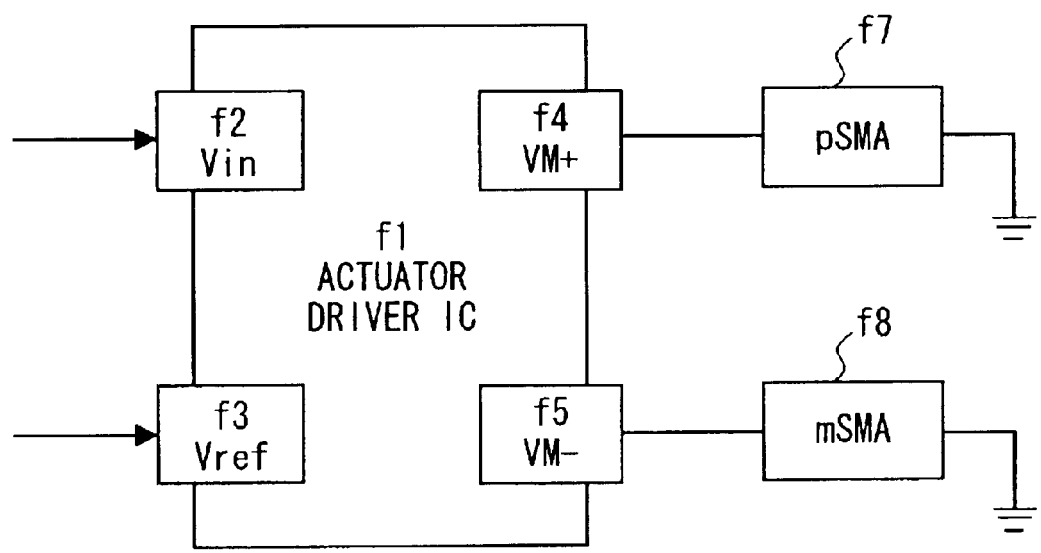
FIG. 6 is a block diagram of the actuator driver IC of the driving apparatus of the first embodiment

FIG. 6 is a diagram showing the details of the actuator driver c10 (see FIG. 4). In this figure, reference symbol f1 represents the actuator driver IC proper, f2 represents a Vin terminal, f3 represents a Vref terminal, f4 represents a VM+ terminal, f5 represents a VM-terminal, f7 represents a pSMA (corresponding to c1 in FIG. 4), and f8 represents an mSMA (corresponding to c12 in FIG. 4).

The actuator driver IC proper f1 is a driver IC designed for the servo driving of a DC motor or moving coil. In analog servo driving, the optimum applied voltage is determined according to the target position (state) and the actual position (state). To apply the applied voltage thus determined to actuators, here, a linear driver circuit with a high current feed capacity is used.

The value of the voltage to be applied is entered via the Vin terminal f2. The entry of this value is achieved through the voltage gain conversion/LPF circuit c7 (see FIG. 4). The reference voltage level is entered via the Vref terminal f3. The entry of this level is achieved through the reference voltage (Vref) portion c9 (see FIG. 4) of the servo control circuit.

The VM+ terminal f4 is an output terminal (+side) to the actuator, and is connected to one end of the pSMA f7. The VM− terminal f5 is an output terminal (− side) to the actuator, and is connected to one end of the mSMA f8. The pSMA f7 and mSMA f8 have their respective other ends connected to power ground.

Figure 7:
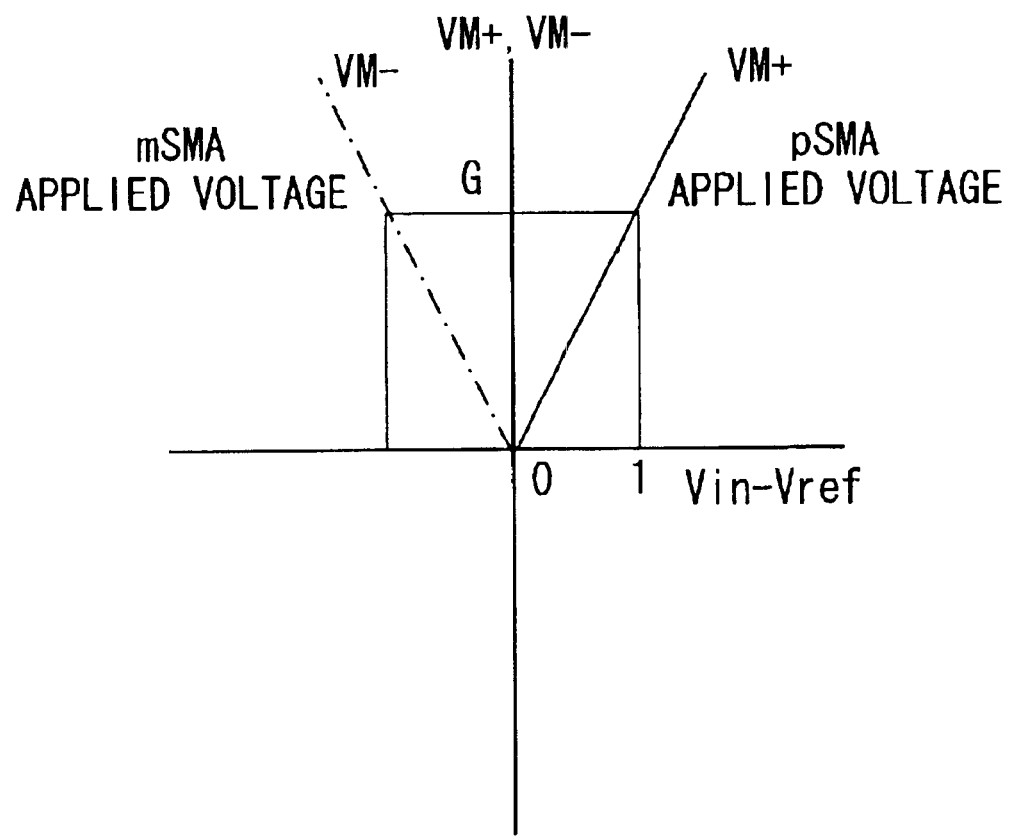
FIG. 7 is a graph of the input-output characteristics of the actuator driver IC of FIG. 6.

FIG. 7 shows the input/output characteristics (the characteristics of the outputs VM+ and VM− with respect to the input Vin−Vref) of the actuator driver IC proper f1. In this figure, along the horizontal axis is taken the value of the input Vin−Vref, and along the vertical axis are taken the values of the outputs VM+ and VM−. The output VM+ (the voltage applied to the pSMA f7) is, when the input Vin−Vref is positive, proportional to the input. By contrast, this output is zero when the input Vin−Vref is negative.

On the other hand, the output VM− (the voltage applied to the mSMA f8) is, when the input Vin−Vref is negative, proportional to the input. By contrast, this output is zero when the input Vin−Vref is positive. Accordingly, the VM+ terminal f4 is connected to one pSMA f7 of the X or Y drive actuator a24 or a26 (see FIG. 2), and the VM− terminal f5 is connected to the other mSMA f8 thereof In this way, two SMAs f7 and f8 can be controlled in an optimized and simple manner with a single servo calculation loop and a linear motor driver designed for motor driving that is connected in the succeeding stage. This makes it possible to achieve fast driving. Here, the linear motor driver denotes the driver circuit, integral with the voltage application method it adopts, that generates, between VM+ and VM−, an applied voltage proportional to the input voltage fed to it.

Servo Control Characteristics

Now, the principle of how a twin-SMA-type actuator is driven will be described. In position control achieved by application of a voltage to an SMA, phase lags occur in the following relationship:

[Voltage]→[Current]→→[Heat Generation]→[Tensile Force (Tensile Force Difference)]→[Acceleration]→→[Velocity]→→[Position]

In the relationship noted above, a 90° phase lag occurs where two arrows "→→" are indicated. Thus, when a voltage is applied to a twin-SMA actuator, the total phase lag is of the third order (270°).

Figure 8:
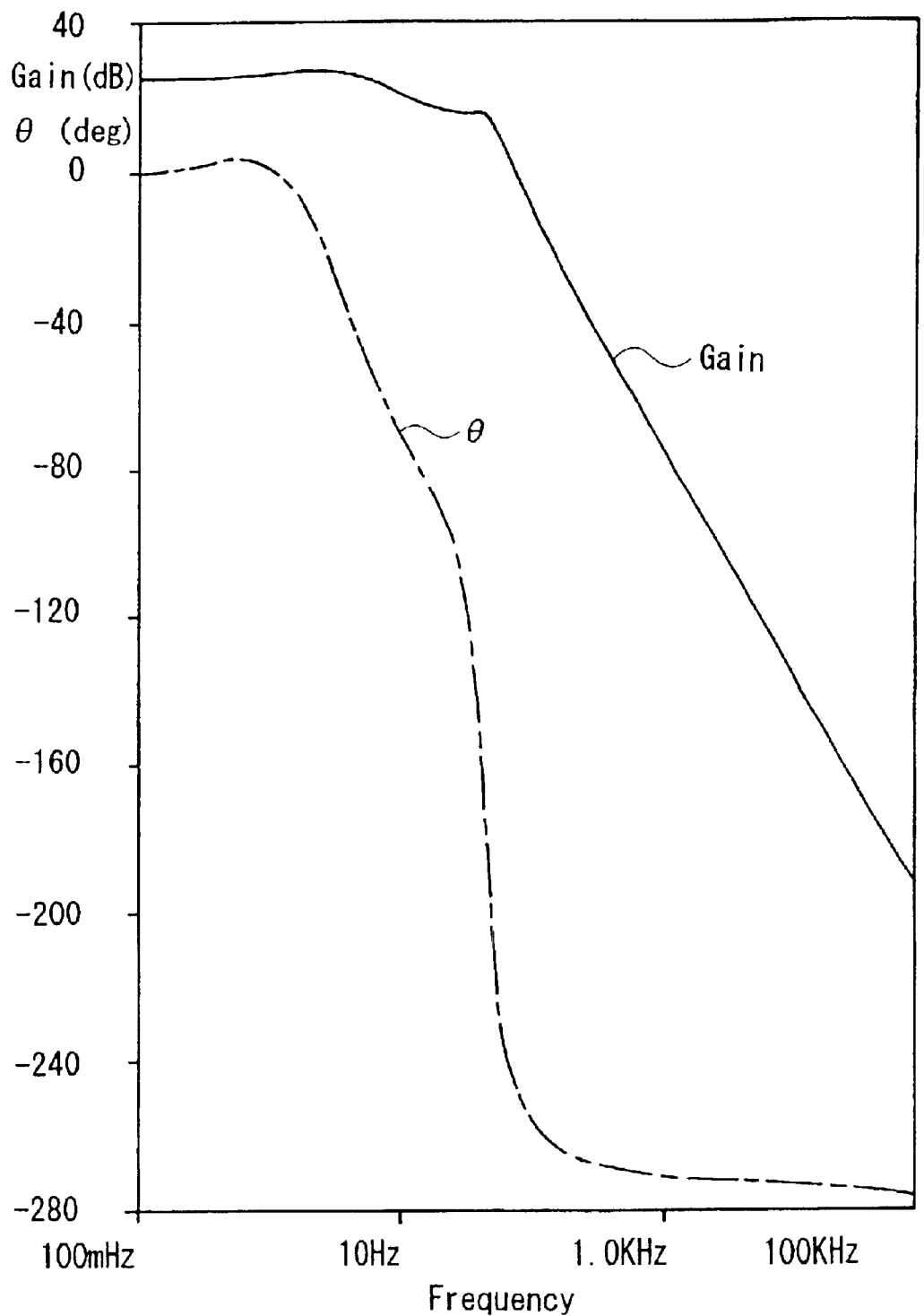
FIG. 8 is a graph of the open characteristics of the driving apparatus of the first embodiment.

FIG. 8 shows the open characteristics of a twin-SMA-type actuator. In the figure, along the vertical axis are taken the gain (in dB) and the phase θ (in degrees), and along the horizontal axis is taken the frequency (in Hz). The solid line indicates the gain characteristic, and the dash-and-dot line indicates the phase (θ) characteristic. The frequency characteristics are determined according to a model formula created on the basis of actual measurement results obtained with a twin-SMA-type actuator. A twin-SMA-type actuator exhibits only a small delay in response; specifically, as shown in the figure, it produces resonance at about 70 Hz and exhibits a 270° delay in phase.

Figure 9:
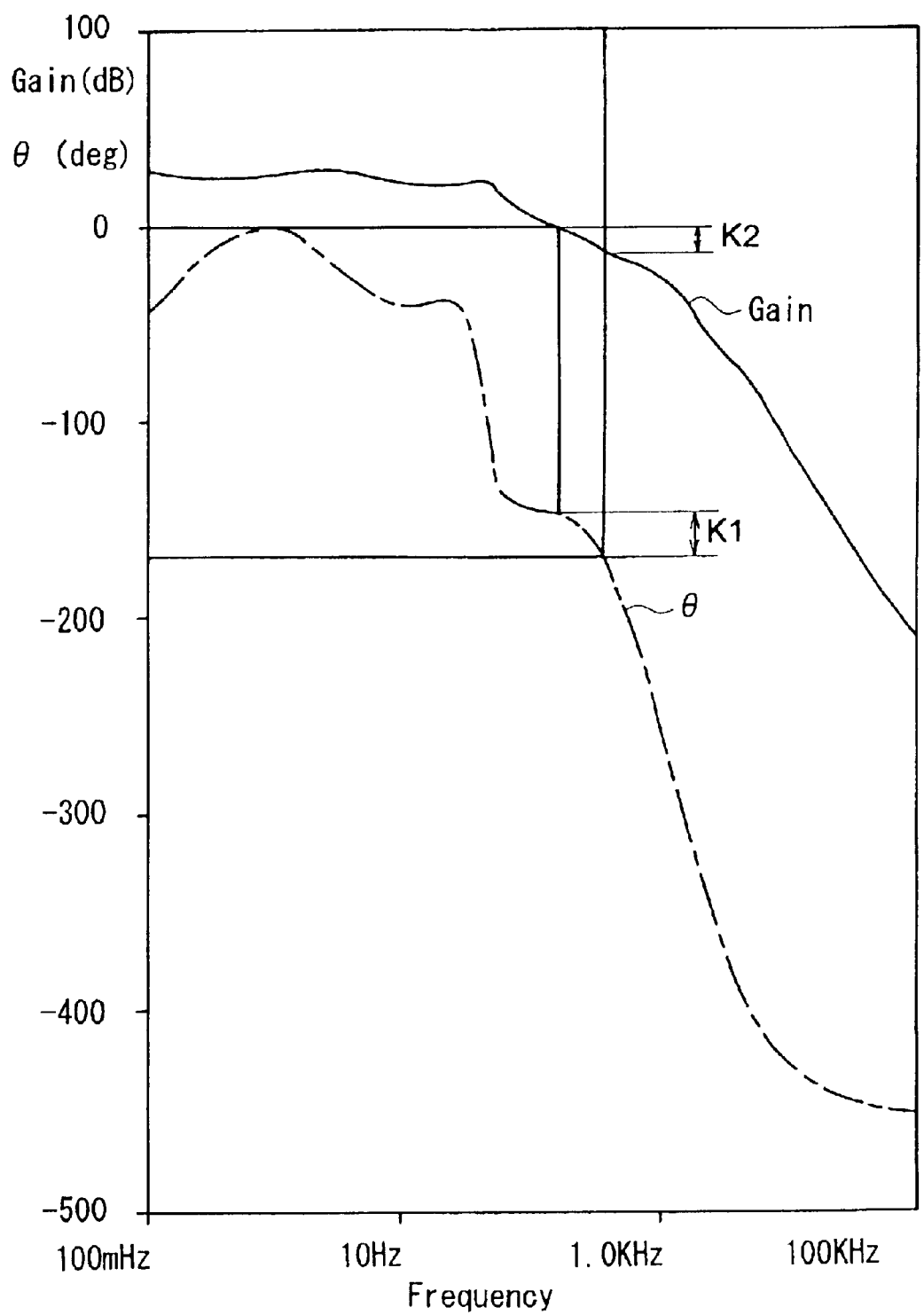
FIG. 9 is a graph of the open characteristics of the driving apparatus of the first embodiment when it is PDD-controlled.

FIG. 9 shows the open characteristics of a twin-SMA-type actuator when it is controlled on a PDD (proportional-differential-differential) basis, in a case where the loop gain is so set as to achieve the target camera shake correction performance (for example, to make the resulting shake ⅛ of the original camera shake). This figure is presented in the same format as FIG. 8.

Differentiation (compensation for a 90° phase delay) is performed twice to compensate for a 180° phase delay. Thus, there exist both a phase margin K1 (the margin for a 180° phase delay when the gain is 0 dB) and a gain margin K2 (the margin for the gain of 0 dB when the phase is delayed by 180°). In this state, stable servo control is possible.

Figure 10:
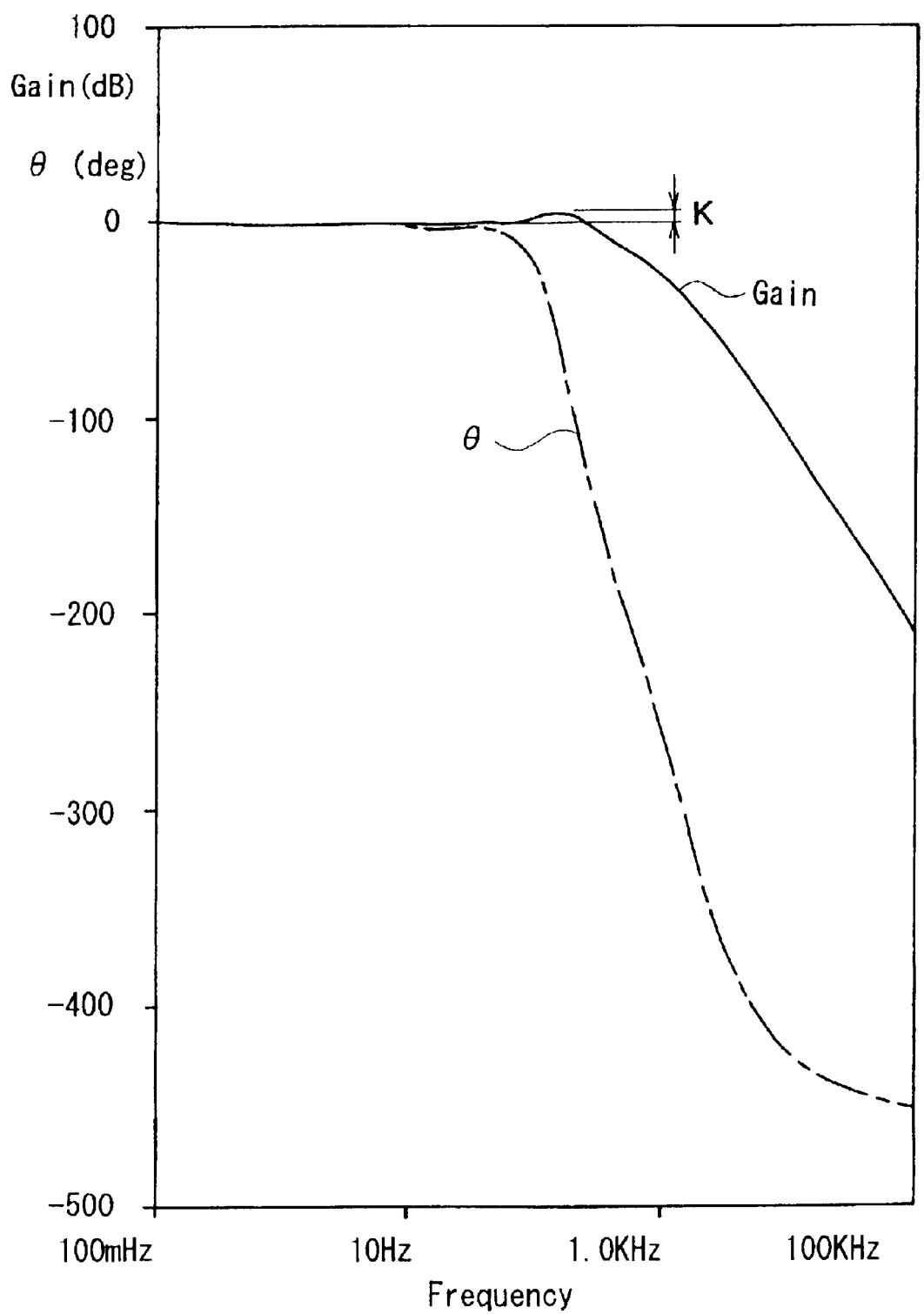
FIG. 10 is a graph of the feedback characteristics of the driving apparatus of the first embodiment when it is PDD-controlled.

FIG. 10 shows the feedback (FB) characteristics when a twin-SMA-type actuator is controlled on a PDD (proportional-differential-differential) basis. This figure is presented in the same format as FIG. 8. As the gain characteristic becomes higher over 0 db, the resonance becomes greater. However, in FIG. 8, the overshoot over 0 dB is small. This prevents great resonance and makes ideal servo control possible. Through the control described above, fast servo control is realized by the use of a twin-SMA-type actuator.

Figure 14:
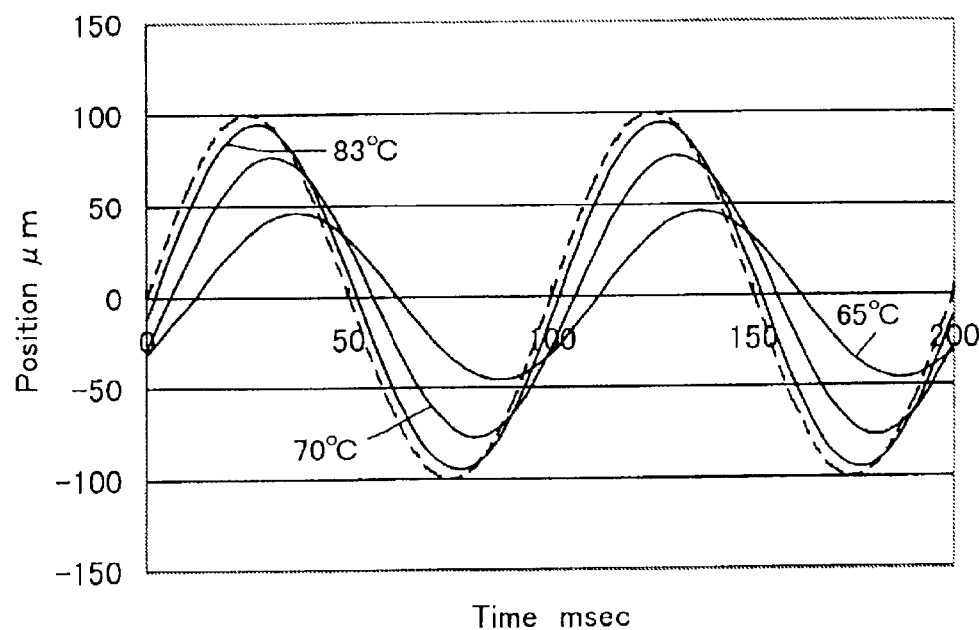
FIG. 14 is a graph showing the response characteristics of the driving apparatus of the first embodiment.

FIG. 14 shows the response characteristics of the X and Y drive actuators a24 and a26 (see FIG. 2) observed when the camera shake correction system is operated in the camera 1 configured as described above. In this figure, along the vertical axis is taken the position (in $\mu$m) of the movable member, and along the horizontal axis is taken the lapse of time (in msec). The figure shows the response characteristics of the shape memory alloy members d7, d8, d17, and d18 (see FIG. 1) when they have operating temperatures of 70° C. and 83° C., and, for comparison, also shows those of conventional shape memory alloy members with an operating temperature of 65° C. Here, the actuators are operated at a frequency of 10 Hz at an ambient temperature of 50° C., and the broken line indicates the target position against a shake of ±100 $\mu$m.

As shown in the figure, all shape memory alloys with any operating temperatures exhibit delays with respect to the target position. Specifically, for example, when the pSMA (d7 or d17) (see FIG. 1) is energized, heat dissipation from the mSMA (d8 or d18) is insufficient, and thus the elastic force of the mSMA (d8 or d18) surpasses the contractive force of the pSMA (d7 or d17).

Subsequently, as heat dissipates from the mSMA (d8 or d18), the pSMA (d7 or d17) contracts with a delay, and thus the movable member moves in the positive (+) direction. However, before the movable member reaches the target position, the mSMA (d8 or d18) is energized, and thus the movable member never reaches the target position.

Figure 15:
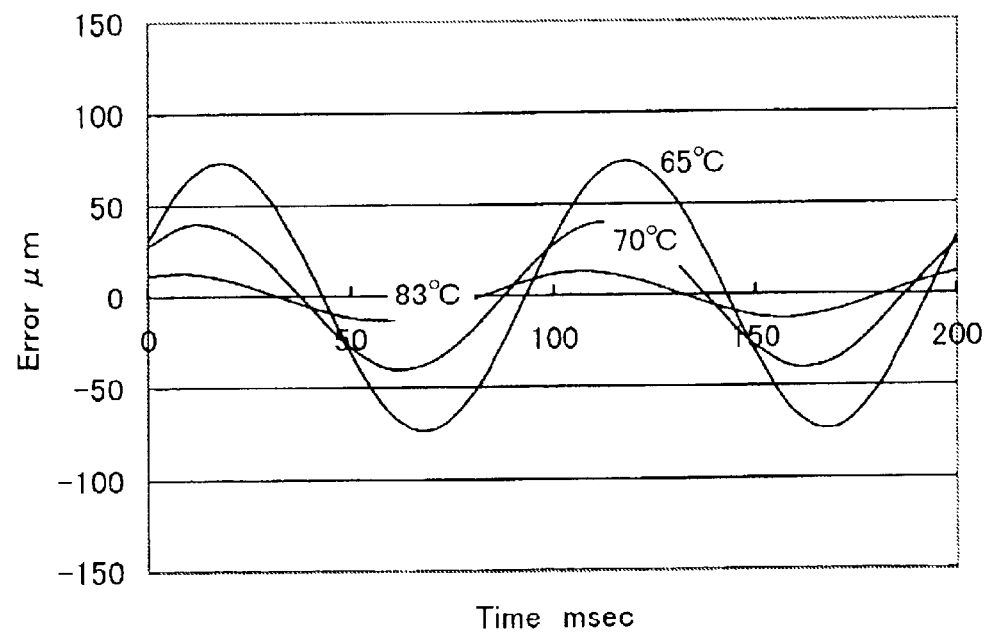
FIG. 15 is a graph showing the correction errors of the driving apparatus of the first embodiment.

Even then, shape memory alloys having operating temperatures of 83° C. and 70° C. exhibit shorter delays than a conventional one having an operating temperature of 65° C. The differences of the response characteristics at each operating temperature from the target position constitute the errors involved in correction. FIG. 15 is a diagram showing the errors with respect to the correction performed. In this figure, along the vertical axis is taken the error (in $\mu$m), and along the horizontal axis is taken the lapse of time (in msec).

With a conventional operating temperature of 65° C., the error is about 75% (75 $\mu$m/100 $\mu$m). By contrast, with an operating temperature of 83° C., the error is about 10% (10 $\mu$m/100 $\mu$m), and, with an operating temperature of 70° C., the error is about 40% (40 $\mu$m/100 $\mu$m).

Accordingly, with an operating temperature of 70° C. or higher, it is possible, even at an ambient temperature of 50° C. or higher, to correct for more than half of the amount of camera shake. This makes practical correction possible. Thus, it is possible to achieve satisfactory camera shake correction at 50° C., which is generally considered the upper limit of the temperature range in which a camera or the like is guaranteed to operate correctly.

With an operating temperature of 80° C. or higher, the correction error can be reduced to below 10%, which is effective where highly accurate response is required. It is to be noted that, at an ambient temperature of 25° C., all the shape memory alloys having operating temperatures of 65° C., 70° C., and 83° C. exhibit satisfactory response characteristics comparable with those of the shape memory alloy having an operating temperature of 83° C. shown in FIG. 14.

By giving the temperature hysteresis a width tw (see FIG. 11) of 20° C. or narrower, it is possible to reduce the delay in time of displacement with respect to the application of a voltage to the shape memory alloy, and thereby achieve fast response.

It is preferable to provide a cooling device for cooling the shape memory alloy elements d7, d8, d17, and d18 to prompt heat dissipation therefrom. As the cooling device, it is possible to use a fan d20 as shown in FIG. 1 described earlier, a Peltier device, or the like.

Figure 16:
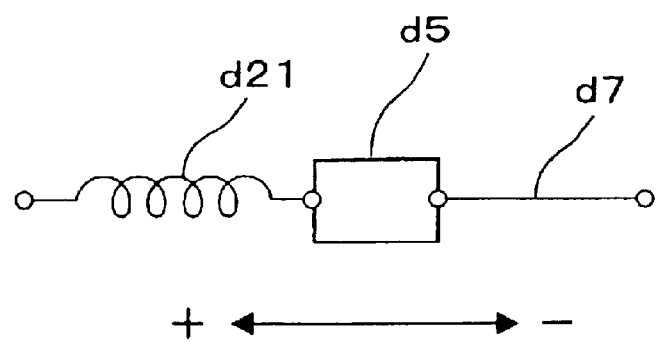
FIG. 16 is a diagram showing an outline of a modified version of the driving apparatus of the fist embodiment.

This embodiment adopts a twin-SMA construction. However, it is also possible, as shown in FIG. 16, to adopt a construction in which the movable member is pulled, at one end, by a shape memory alloy element d7 and, at the other end, by a loading means d21 such as a spring. With this construction also, by giving the shape memory alloy member d7 an operating temperature of 70° C. or higher, it is possible to achieve fast response.

Figure 17:
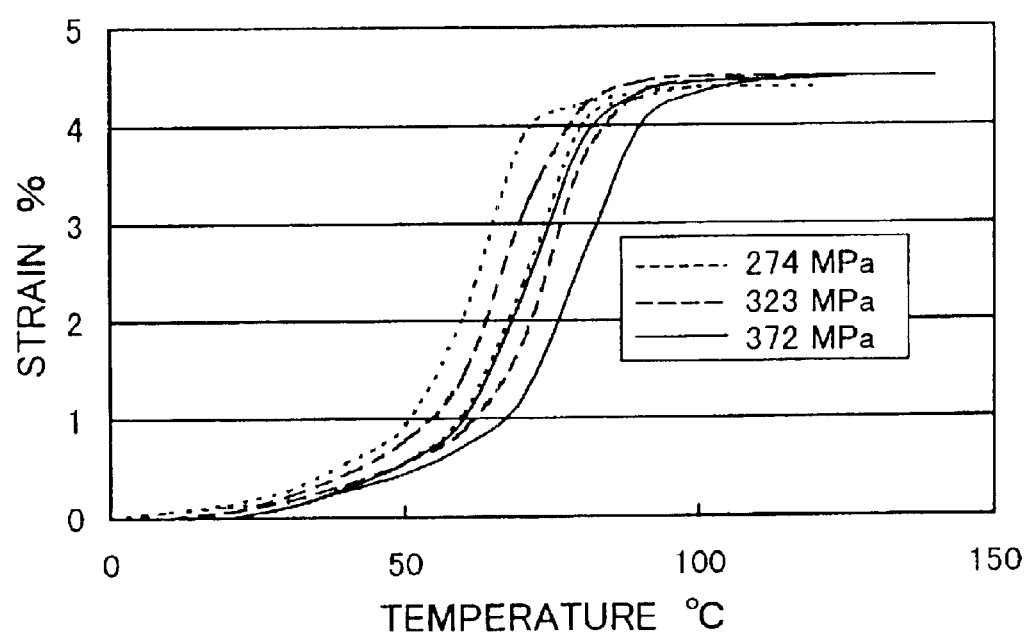
FIG. 17 is a diagram showing the variation in temperature hysteresis ascribable to the strain of the shape memory alloy.
Figure 22:
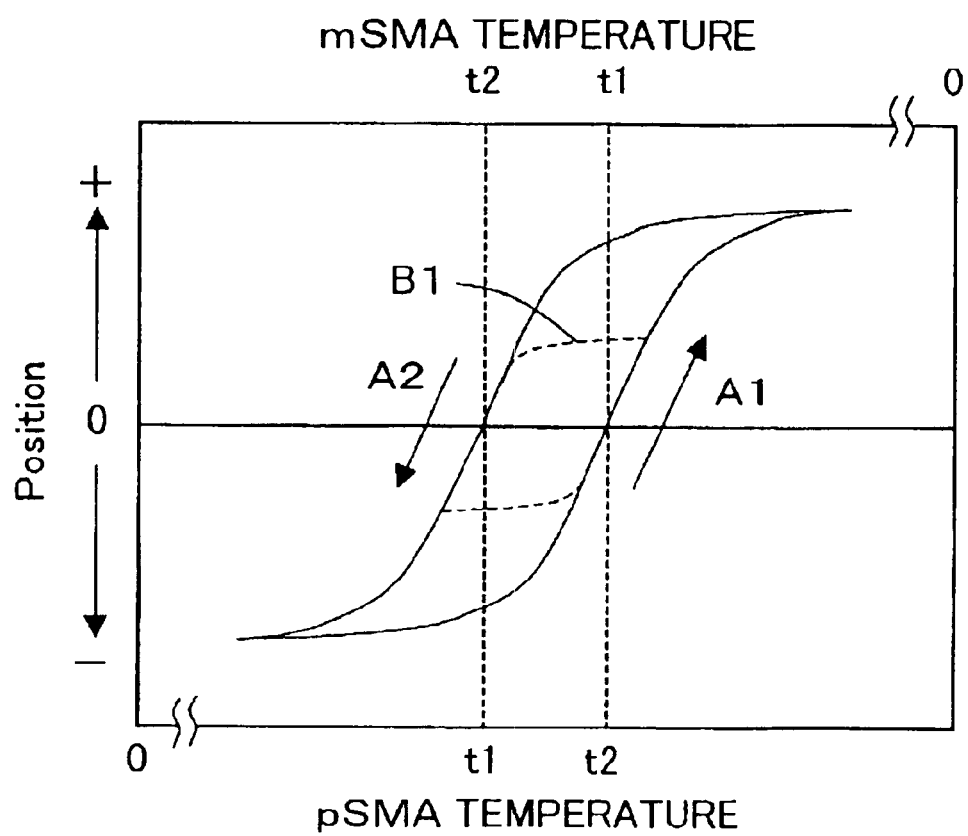
FIG. 22 is a graph of the temperature hysteresis of a twin-SMA-type driving apparatus.
Figure 23:
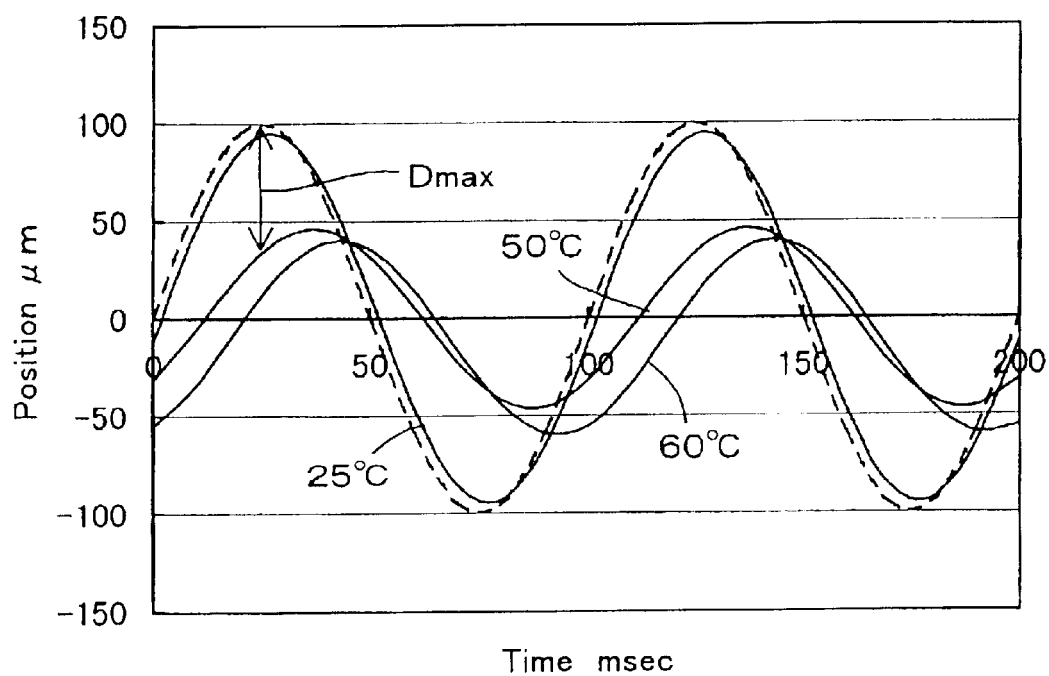
FIG. 23 is a graph of the response characteristics of a conventional driving apparatus.
Figure 24:
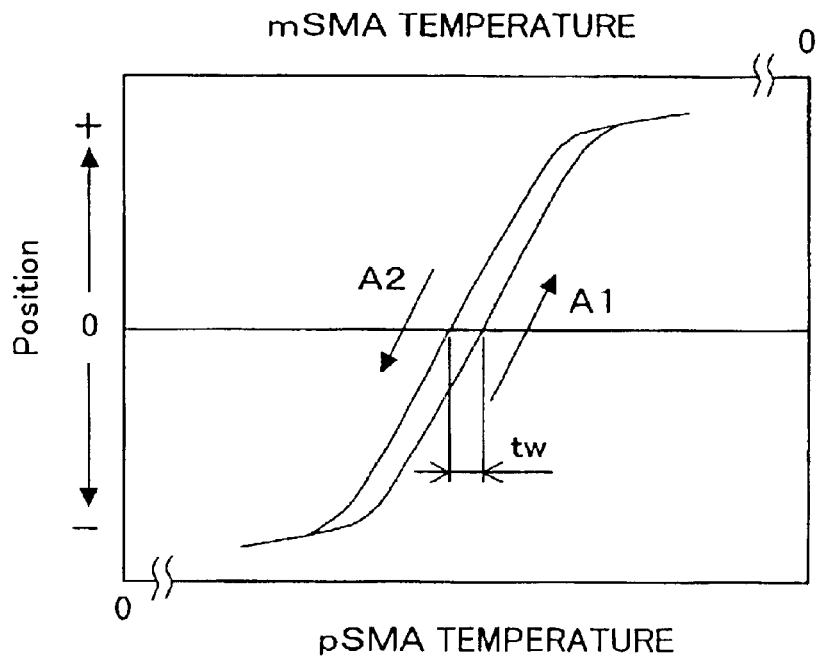
FIG. 24 is a graph of the temperature hysteresis of a conventional driving apparatus.
Figure 25:
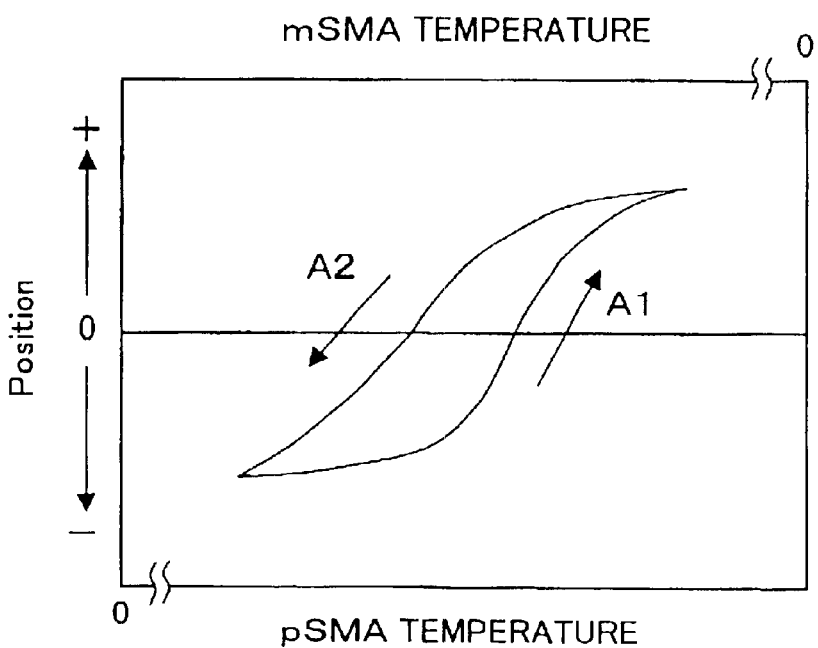
FIG. 25 is a graph of the temperature hysteresis of a conventional driving apparatus.

In this embodiment, the operating temperature of the shape memory alloy is heightened by heat treatment; however, it may be heightened by application of strain to the shape memory alloy. FIG. 17 is a diagram showing the temperature hysteresis of the same shape memory alloy as used in the conventional example (see FIG. 22), observed when it is loaded with a force that tends to expand it. In the figure, along the vertical axis is taken the strain (in %), and along the horizontal axis is taken the temperature (in ° C.).

In the figure, the upward direction is that of contraction, and different types of line indicate the temperature hysteresis observed under different strengths of strain resulting from the applied force, namely 274 MPa, 323 MPa, and 372 MPa. This figure shows that the same shape memory alloy has a higher operating temperature as it is subjected to stronger strain. This makes it possible to give the shape memory alloy an operating temperature of 70° C. or higher, and thereby achieve fast response under a high-temperature condition such as at an ambient temperature of 50° C. or higher.

Figure 18:
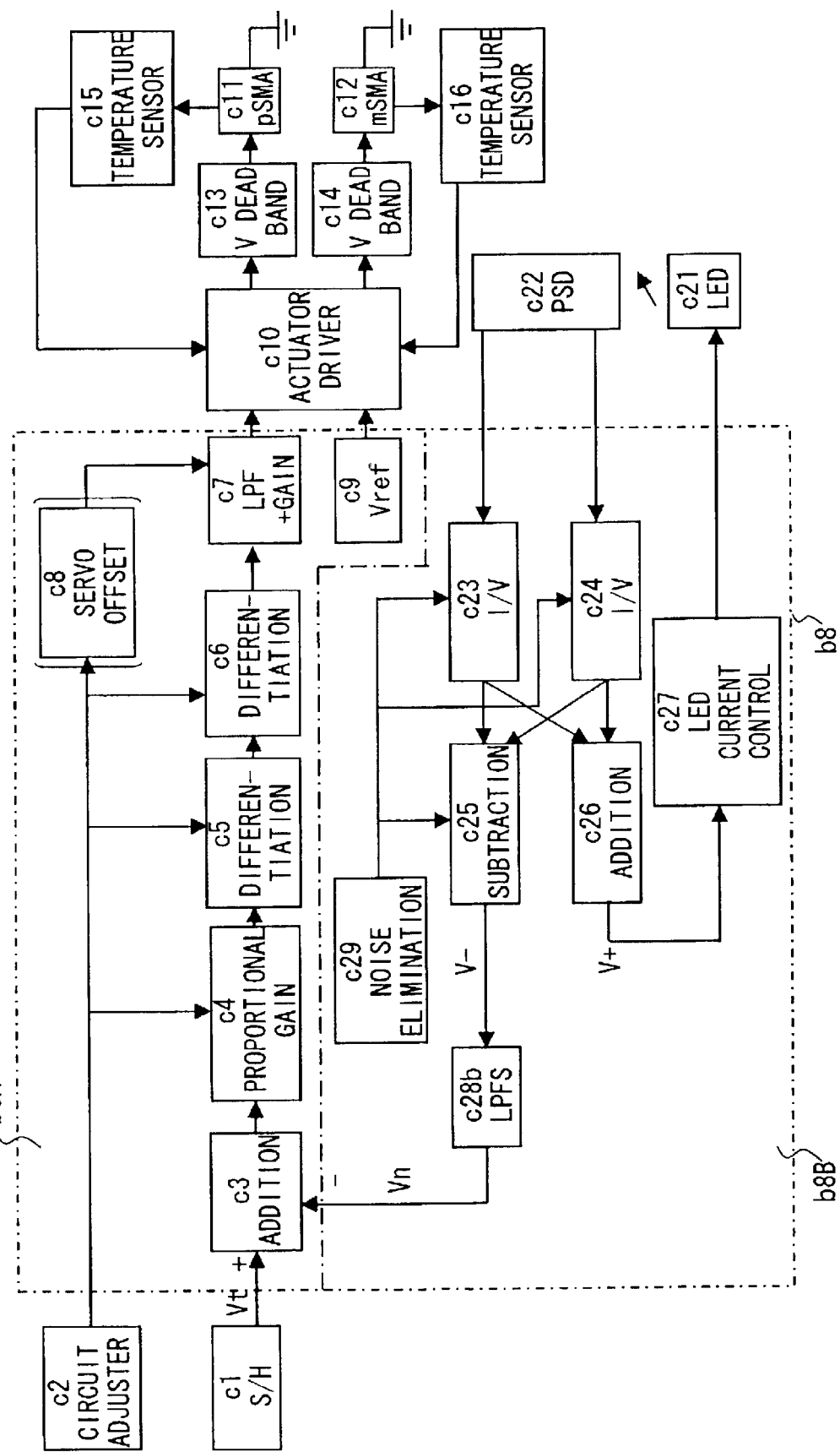
FIG. 18 is a block diagram of the servo control circuit of a camera shake correction system incorporating the driving apparatus of a second embodiment of the invention.

Next, a second embodiment of the invention will be described. This embodiment deals with a camera incorporating a camera shake correction system similar to that of the first embodiment shown in FIGS. 1 to 17 and described above. FIG. 18 is a circuit diagram showing the interconnection between a servo control circuit b8 of the camera shake correction system, a pSMA c11, and an mSMA c12 in this embodiment.

The differences from the first embodiment (FIG. 4) are as follows. The position detector b8B is provided with a noise reducer c29. Moreover, between the actuator driver c10 and the pSMA c11 and between the actuator driver c10 and the mSMA c12 are provided diodes c13 and c14 for producing voltage dead bands. Furthermore, temperature sensors c15 and c16 for detecting the temperatures of the pSMA c11 and mSMA c12 are provided. In other respects, the configuration here is the same as in the first embodiment.

Figure 19:
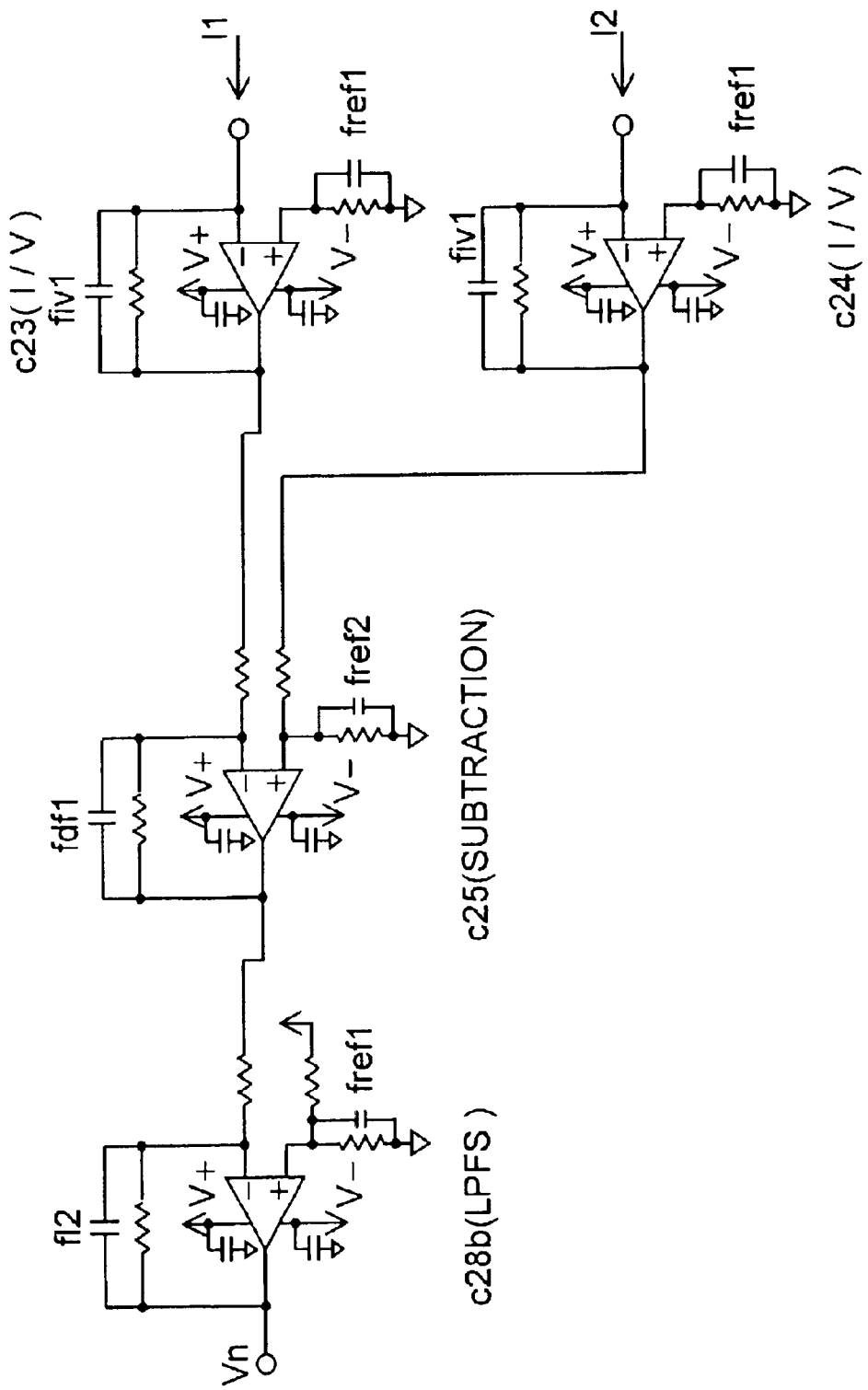
FIG. 19 is a circuit diagram of the position detection circuit, for PSDs, of the camera shake correction system incorporating the driving apparatus of the second embodiment.
Figure 26:
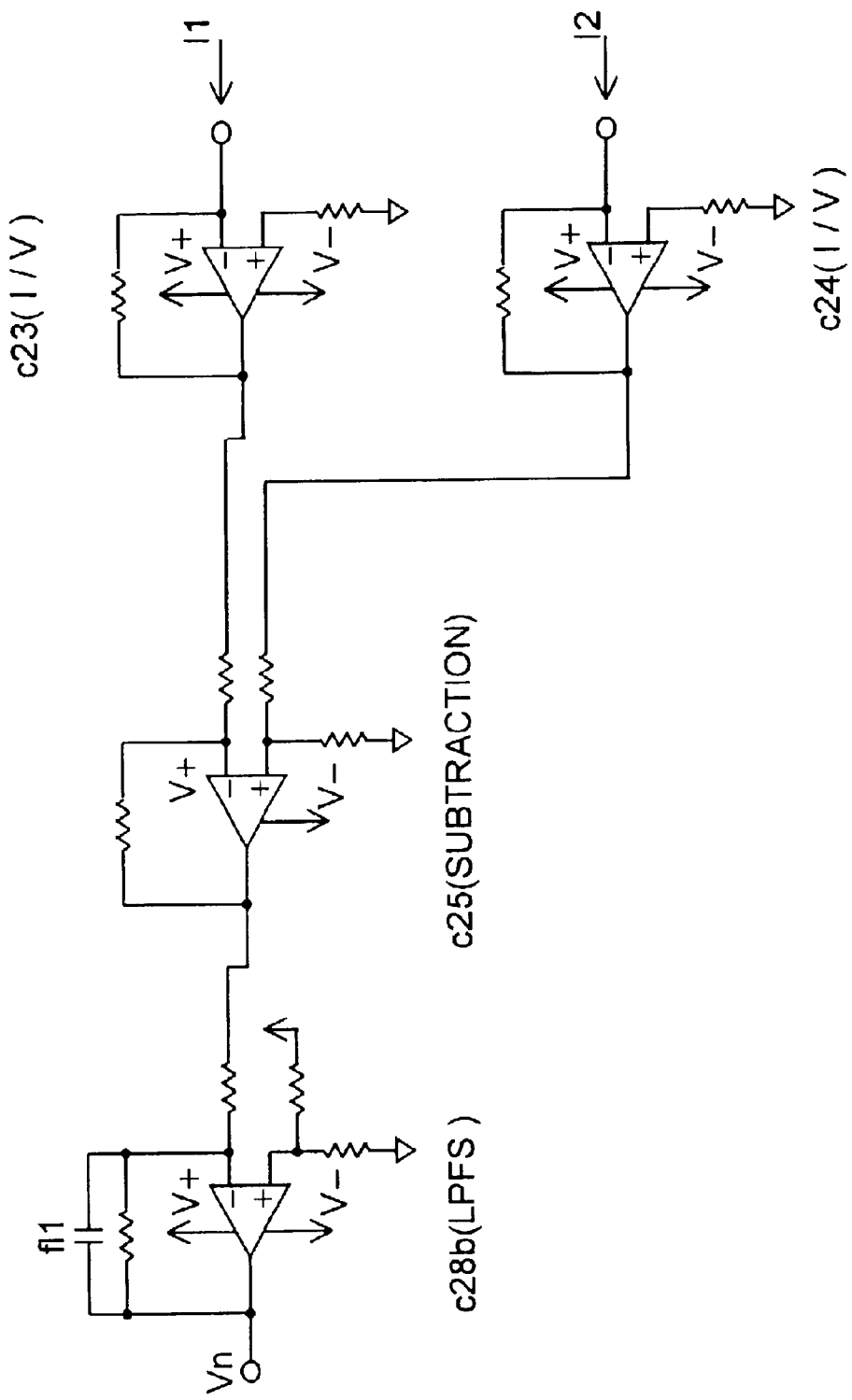
FIG. 26 is a circuit diagram of a typical position detection circuit for PSDs.

FIG. 19 is a circuit diagram showing the I/V conversion circuits c23 and c24, the subtraction circuit c25, and an LPFS c28b, with a noise reducer c29 added thereto. The LPFS c28b is composed of an LPF and an offset voltage correcting circuit. FIG. 26 shows a circuit diagram showing a common noise reduction circuit. The I/V conversion circuits c23 and c24, the subtraction circuit c25, and the LPFS c28b each have an operation amplifier.

Generally, no capacitors are provided at the supply voltage terminals of the operational amplifiers of the I/V conversion circuits c23 and c24 and the subtraction circuit c25. By contrast, in this embodiment, capacitors are provided individually at the supply voltage terminals of the operational amplifiers of the I/V conversion circuits c23 and c24 and the subtraction circuit c25. This helps reduce the noise in the power supplied to the amplifier circuits at cutoff frequencies of fiv1 and fdf1, respectively.

Moreover, in this embodiment, capacitors are provided also at the + input terminals of the individual operational amplifiers. This helps reduce the noise in the input voltages at cutoff frequencies of fref1 and fref2, respectively. The effect of noise reduction is particularly remarkable with the I/V conversion circuits c23 and c24, which handle very week currents and thus have high resistances.

The cutoff frequency fref1 of the I/V conversion circuits c23 and c24 and the LPFS c28b are set low, because the noise reduction here targets voltage levels that remain constant during position detection. The cutoff frequency fref2 of the subtraction circuit c25 is determined in consideration of the response desired in position detection, because the noise reduction here targets a voltage level that varies during position detection as the movable member moves.

On the other hand, noise does not matter greatly in the servo control circuit other than the twin-SMA actuators. Therefore, the cutoff frequency fl1 of the LPFS c28b shown in FIG. 26 is set at such a frequency as to offer a sufficient margin for a servo delay. By contrast, in this embodiment, the cutoff frequency fl2 of the LPFS (c28b) is so set that fl2<fl1 (see FIG. 26) so as to be a frequency close to the delay limit.

Moreover, the cutoff frequencies fiv1, fdf1, and fl2 of the I/V conversion circuits c23 and c24, the subtraction circuit c25, and the LPFS c28b are each optimized. Specifically, they are so set that fl2<fiv1 and fl2<fdf1, i.e., so that the cutoff frequency fl2 is the ultimate cutoff frequency. Moreover, the cutoff frequencies fiv, fdf1, and fl2 are so determined that the total delay in time ascribable thereto does not produce such a delay in the servo loop as to degrade the servo performance. Furthermore, the cutoff frequency fiv1 is set at such a frequency as to suppress mainly PSD light shot noise and circuit calculation noise. These different modes of optimization may be combined together, or effective ones may be selected from among them. Optimization is performed while monitoring how the noise in the output voltage Vn is reduced and how long is the delay in time.

If the twin-SMA actuators are controlled on the basis of position signals containing large noise, the pSMA c11 and mSMA c12 may be overheated. However, providing the noise reducer c29 described above helps reduce noise in the position signals and thereby prevent the overheating of the pSMA c11 and mSMA c12. In this way, it is possible to prevent malfunctioning and destruction of the twin-SMA actuators.

In FIG. 18, the diodes c13 and c14 (serving as an applied-voltage dead-band provider) produce dead bands in the applied voltage or current output from the actuator driver c10. This prevents unnecessary voltages or currents from being applied to the pSMA c11 and mSMA c12. For example, it is possible to prevent voltages lower than a predetermined voltage from being applied to the pSMA c11 and mSMA c12. This makes it possible to prevent the pSMA c11 and mSMA c12 from becoming excessively hot.

Moreover, when the temperature sensors c15 and c16 (serving as an overheating preventer) detect that the temperatures of the pSMA c11 and mSMA c12 have risen to a predetermined temperature, the power to the actuator driver c10 is cut off. This makes it possible to inhibit or reduce the supply of power when the temperatures of the pSMA c11 and mSMA c12 have reached a temperature that predicts overheating. In this way, it is possible to prevent overheating of the pSMA c11 and mSMA c12.

In this embodiment, all of the noise reducer c29, the applied-voltage dead-band provider c13 and c14, and the overheating preventer c15 and c16 are provided. However, it is also possible to provide only one or two of them.

This embodiment deals with a construction in which two shape memory alloy members are operated alternately. However, any other construction may be adopted. For example, the driving apparatus may be composed of a single shape memory alloy member and a member that produces a force acting in the opposite direction to that in which the shape memory alloy member produces its driving force. In that case also, by continuously repeating heat application and heat dissipation, it is possible to prevent overheating. This, however, is more effective in a case where, as in this embodiment, two or more shape memory alloy members are heated alternately, because the ambient temperature tends to rise more rapidly and thus overheating is more likely.

Figure 20:
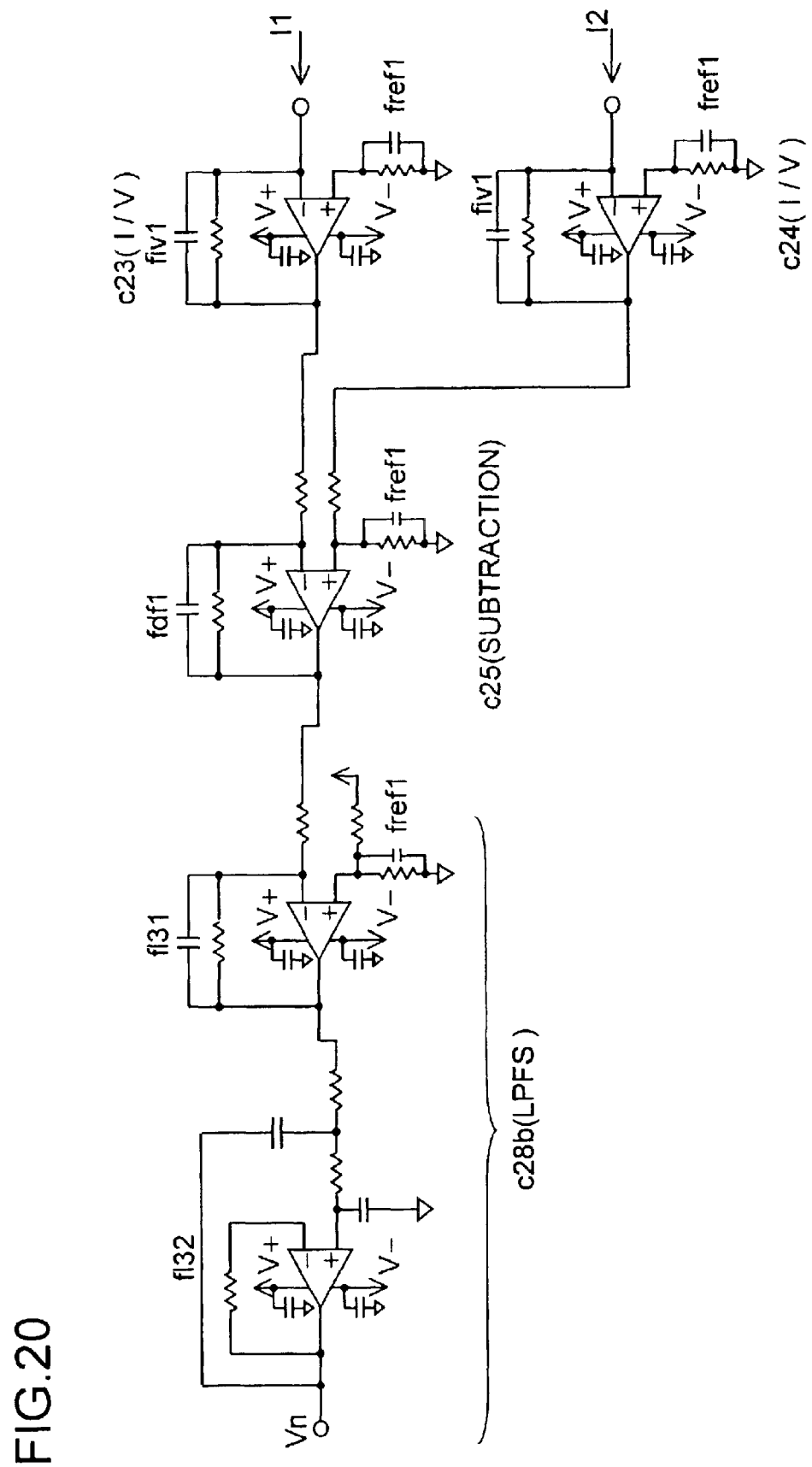
FIG. 20 is a circuit diagram of the position detection circuit, for PSDs, of the camera shake correction system incorporating the driving apparatus of a third embodiment of the invention.
Figure 21:
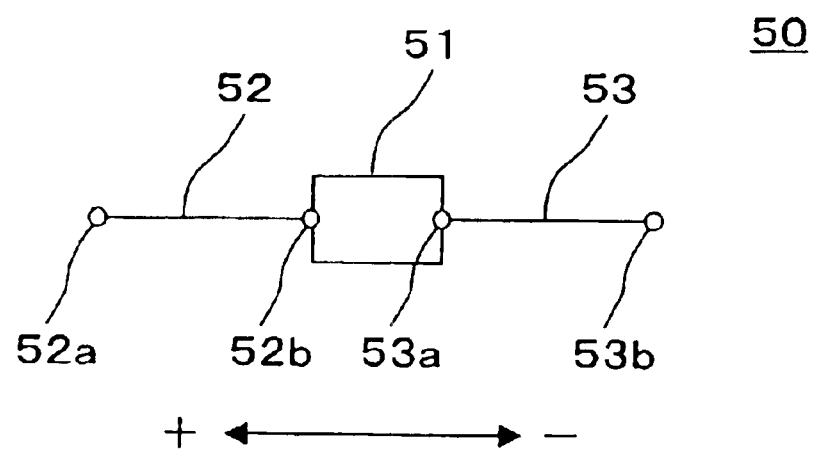
FIG. 21 is a diagram illustrating the principle of a twin-SMA-type driving apparatus.

Next, a third embodiment of the invention will be described. This embodiment deals with a camera incorporating a camera shake correction system similar to those of the first and second embodiments shown in FIGS. 1 to 19 and described above. FIG. 20 is a circuit diagram showing a portion of the position detection circuit provided in the servo control circuit of the camera shake correction system of this embodiment. As compared with the second embodiment shown in FIG. 19 and described above, the LPFS c28b has a different configuration. In other respects, the configuration here is the same as in the second embodiment.

The LPFS c28b is divided into a primary LPF and a secondary LPF having different offset frequencies fl31 and fl32. This makes it possible to reduce high-order noise components and thereby obtain enhanced noise reduction performance. Moreover, as in the second embodiment, the position detection circuit is optimized so that the total delay in time ascribable to fiv1+fdf1+fl31+fl32 does not degrade the servo performance.

Thus, it is possible to further reduce the noise in the position signals and thereby further prevent the overheating of the pSMA c11 and the mSMA c12. This makes it possible to prevent malfunctioning and destruction of the twin-SMA actuators.

The driving apparatuses (the X and Y drive actuators a24 and a26) of the first to third embodiments may be applied to apparatuses other than camera shake correction systems for cameras.

What is claimed is:

1. A driving apparatus, comprising:

a shape memory alloy member connected to a movable member; and an electric supplier for heating the shape memory alloy member by applying a voltage or current thereto, the supplier making the shape memory alloy member expand and contract, through generation of heat based on the application by the supplier and through dissipation of heat therefrom resulting from suspension of the application by the supplier, so as to drive the movable member to move, wherein the shape memory alloy member is configured to operate at a temperature of 70° C. or higher, and the driving apparatus is for driving a hand shake correction apparatus and includes an actuator that is controlled by a servo and whose temperature is controlled continuously, the driving apparatus further comprising:

a loading mechanism for loading the movable member with a force that acts in the direction opposite to that exerted by the shape memory alloy, wherein by operating the shape memory alloy at a temperature of 70° C. or higher, hand shake by the hand shake correction apparatus can be corrected.

2. The driving apparatus as claimed in claim 1, wherein temperature hysteresis of an amount of expansion and contraction of the shape memory alloy member in relation to a temperature thereof during heat application and heat dissipation has a width of 20° C. or smaller.

3. The driving apparatus as claimed in claim 1, wherein the shape memory alloy member is made of a Ti—Ni—Cu alloy.

4. The driving apparatus as claimed in claim 3, wherein the shape memory alloy member has been subjected to heat treatment at a temperature of 300° C. or higher.

5. The driving apparatus as claimed in claim 1, further comprising:

a cooler for cooling the shape memory alloy member, wherein the movable member is driven to move by making the shape memory alloy member expand and contract through generation of heat based on the application by the supplier and through dissipation of heat therefrom by suspension of the application by the supplier and by cooling by the cooler, and the driving apparatus is an actuator that is controlled by a servo and whose temperature is controlled continuously.

6. A driving apparatus, comprising:

a shape memory alloy member connected to a movable member;

a second shape memory alloy member connected to the movable member;

a driving controller for heating in turn the shape memory alloy members by applying a voltage or current thereto so that the movable member is driven to move by a generated force exerted by the shape memory alloy member deformed by being heated; and an overheating preventer for preventing overheating of the shape memory alloy member that is being heated, wherein one of the shape memory alloy members is repeatedly deformed by application of heat so as to exert a force to and thereby deform the other shape memory alloy member in order to thereby drive the moveable member, and energization of the shape memory alloy member that is deformed by application of heat is so controlled as to prevent a temperature of this shape memory alloy member from becoming unduly high when this shape memory alloy member in turn becomes a target to be deformed by the force exerted as a result of the other shape memory member being heated.

7. The driving apparatus as claimed in claim 6, further comprising:

a position sensor for detecting a position of the movable member, wherein the overheating preventer is a noise reducer that reduces noise in a position signal obtained from the position sensor.

8. The driving apparatus as claimed in claim 6, wherein the noise reducer reduces noise in a reference signal.

9. The driving apparatus as claimed in claim 6,
wherein the noise reducer is a low-pass filter with a high-order feedback loop delay limit.

10. The driving apparatus as claimed in claim 6,
wherein the overheat preventer is an applied-voltage dead-band provider that provides a dead band in the voltage applied to the shape memory alloy member.

11. The driving apparatus as claimed in claim 10,
wherein the applied-voltage dead-band provider is a diode.

12. A driving apparatus comprising:

a pair of shape memory alloy members connected to a movable member;

a driving controller for heating one of the shape memory alloy members by applying a voltage or current thereto, said one of the shape memory alloy members, as a result of being heated and thereby deformed, moves the moveable member while simultaneously deforming the other shape memory alloy member of the pair of shape memory alloy members; and an overheating predictor for predicting overheating by detecting a sign of upcoming overheating of the shape memory alloy member before an overheating temperature is reached, wherein the driving controller restrains or suspends energization of the shape memory alloy member when a result of detection by the overheating predictor indicates, before overheating, a predetermined temperature which is lower than the overheating temperature and predicts upcoming overheating.

13. The driving apparatus as claimed in claim 12,
wherein the overheating predictor is a temperature sensor that detects a temperature of the shape memory alloy member.

14. The driving apparatus as claimed in claim 12, further comprising:

a second shape memory alloy member connected to the movable member, wherein the driving controller continuously heats one and then the other of the shape memory alloy members alternately by applying a voltage or current thereto so that, by a generated force exerted by one shape memory alloy member deformed by being heated, the other shape memory alloy member is deformed and the movable member is driven to move.

15. A driving apparatus, comprising:

a shape memory alloy member connected to a movable member;

a driving controller for heating the shape memory alloy member by applying a voltage or current thereto so that the movable member is driven to move by a generated force exerted by the shape memory alloy member deformed by being heated;

an overheating preventer for preventing overheating of the shape memory alloy member; and a position sensor for detecting a position of the movable member, wherein the overheating preventer is a noise reducer that reduces noise in a position signal obtained from the position sensor.

16. The driving apparatus as claimed in claim 15,
wherein the noise reducer reduces noise in a reference signal.

17. The driving apparatus as claimed in claim 15,
wherein the noise reducer is a low-pass filter with a high-order feedback loop delay limit.

* * * * *